US009494721B2

(12) United States Patent
Nam et al.

(10) Patent No.: US 9,494,721 B2
(45) Date of Patent: Nov. 15, 2016

(54) POLARIZER, A DISPLAY PANEL HAVING THE SAME AND A METHOD OF MANUFACTURING THE SAME

(71) Applicant: SAMSUNG DISPLAY CO., LTD., Yongin, Gyeonggi-Do (KR)

(72) Inventors: Jung-Gun Nam, Seoul (KR); Moon-Jung An, Seoul (KR); Dae-Young Lee, Seoul (KR); Dae-Hwan Jang, Gyeonggi-do (KR); Gug-Rae Jo, Chungcheongnam-do (KR); Atsushi Takakuwa, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 244 days.

(21) Appl. No.: 14/108,853

(22) Filed: Dec. 17, 2013

(65) Prior Publication Data

US 2015/0002791 A1 Jan. 1, 2015

(30) Foreign Application Priority Data

Jun. 26, 2013 (KR) ........................ 10-2013-0073581

(51) Int. Cl.
*G02F 1/1335* (2006.01)
*G02B 5/30* (2006.01)

(52) U.S. Cl.
CPC . *G02B 5/3058* (2013.01); *G02F 2001/133548* (2013.01)

(58) Field of Classification Search
None
See application file for complete search history.

(56) References Cited

U.S. PATENT DOCUMENTS

| | | | | |
|---|---|---|---|---|
| 6,888,661 | B1 * | 5/2005 | Islam | G02F 1/01 349/198 |
| 7,605,883 | B2 | 10/2009 | Yamaki et al. | |
| 8,027,087 | B2 | 9/2011 | Perkins et al. | |
| 8,081,273 | B2 * | 12/2011 | Choo | G02F 1/133536 349/100 |
| 8,525,958 | B2 * | 9/2013 | Lee | G02F 1/133536 349/114 |
| 2006/0119937 | A1 * | 6/2006 | Perkins | G02B 5/3058 359/485.03 |
| 2011/0310333 | A1 * | 12/2011 | Kim | G02B 1/105 349/96 |

FOREIGN PATENT DOCUMENTS

| | | | |
|---|---|---|---|
| JP | 2007-10713 | * | 1/2007 |
| JP | 2009086095 | | 4/2009 |
| JP | 4688394 | | 2/2011 |
| JP | 2012027221 | | 2/2012 |
| JP | 5069037 | | 8/2012 |

* cited by examiner

*Primary Examiner* — Richard Kim
(74) *Attorney, Agent, or Firm* — F. Chau & Associates, LLC

(57) ABSTRACT

A polarizer includes a base substrate and a dielectric stacked layer. The dielectric stacked layer in includes a first dielectric layer and second dielectric layer. The first dielectric layer has a high refractive index and a second dielectric layer has a low refractive index. A wire grid pattern is disposed on the dielectric stacked layer. The wire grid pattern has a line width, a separation distance and a pitch. The pitch is a sum of the line width and the separation distance. Adjacent grids of the wire grid pattern are spaced apart by the separation distance.

15 Claims, 20 Drawing Sheets

POLARIZER, A DISPLAY PANEL HAVING THE SAME AND A METHOD OF MANUFACTURING THE SAME

CROSS-REFERENCE TO RELATED APPLICATION

This application claims priority under 35 U.S.C. §119 to Korean Patent Application No. 10-2013-0073581, filed on Jun. 26, 2013, the disclosure of which is incorporated by reference herein in its entirety.

TECHNICAL FIELD

Exemplary embodiments of the present invention relate to a polarizer, a display panel having the polarizer, and a method of manufacturing the polarizer.

More particularly, exemplary embodiments of the present invention relate to a wire grid polarizer for a liquid crystal display apparatus, a display panel having the wire grid polarizer, and a method of manufacturing the wire grid polarizer.

DISCUSSION OF THE RELATED ART

Recently, liquid crystal display apparatuses having light weight and small size have been manufactured. A cathode ray tube (CRT) display apparatus has been used due to its performance and competitive price. However, the CRT display apparatus may lack small size or portability. Therefore the liquid crystal display apparatus has been highly regarded due to its small size, light weight and low-power-consumption.

The liquid crystal display apparatus applies a voltage to a specific molecular arrangement of liquid crystals to change the molecular arrangement. The liquid crystal display apparatus displays an image using changes of an optical property (for example, birefringence, rotatory polarization, dichroism or light scattering) of a liquid crystal cell according to the changes of the molecular arrangement.

The liquid crystal display apparatus includes a polarizing plate to control an array of the molecular arrangement of the liquid crystal. A polarizing plate passes polarized light which is in parallel with a transmission axis, and absorbs polarized light which is perpendicular to the transmission axis. The polarizing plate absorbs some of the light from a light source. Thus, efficiency of the liquid crystal display apparatus may be decreased.

When a wire grid polarizer is used for the liquid crystal display apparatus, the efficiency of the liquid crystal display apparatus may be increased by the wire grid polarizer which does not absorb light. However, external light, for example, ultraviolet rays, may reach the inside of the liquid crystal display apparatus, so that the liquid crystal cell may be damaged by the external light.

SUMMARY

Exemplary embodiments of the present invention provide a polarizer capable of increasing light efficiency and protecting a display panel from external ultraviolet ray.

Exemplary embodiments of the present invention provide a display panel having the polarizer.

Exemplary embodiments of present the invention provide a method of manufacturing the polarizer.

According to an exemplary embodiment of the present invention, a polarizer includes a base substrate and a dielectric stacked layer. The dielectric stacked layer includes a first dielectric layer and a second dielectric layer. The first dielectric layer has a high refractive index and the second dielectric layer has a low refractive index. A wire grid pattern is disposed on the dielectric stacked layer. The wire grid pattern has a line width, a separation distance and a pitch. The pitch is a sum of the line width and the separation distance. Adjacent grids of the wire grid pattern are spaced apart by the separation distance.

According to an exemplary embodiment of the present invention, the first dielectric layer may include titanium dioxide (TiO2) and the second dielectric layer may include silicon dioxide (SiO2).

According to an exemplary embodiment of the present invention, the first and second dielectric layers may be alternately stacked seven times. The dielectric layers may have a thickness about 20 nm, 50 nm, 20 nm, 50 nm, 20 nm, 40 nm, 20 nm, 30 nm, 20 nm, 30 nm, 20 nm, 30 nm, 20 nm and 20 nm from the base substrate in order.

According to an exemplary embodiment of the present invention, the polarizer may further include a passivation layer disposed on the wire grid pattern.

According to an exemplary embodiment of the present invention, the wire grid pattern may include a first layer including aluminum (Al), gold (Au), silver (Ag), copper (Cu), chrome (Cr), steel (Fe) or nickel (Ni), and a second layer including molybdenum (Mo), or titanium (Ti).

According to an exemplary embodiment of the present invention, the wire grid pattern may be disposed on the second layer. The wire grid pattern may include a dielectric stacked layer pattern including a dielectric layer having a high refractive index and a dielectric layer having a low refractive index.

According to an exemplary embodiment of the invention, a polarizer includes a base substrate and a wire grid pattern disposed on the base substrate. The wire grid pattern has a line width, a separation distance and a pitch. The pitch is a sum of the line width and the separation distance. Adjacent grids of the wire grid pattern are spaced apart by the separation distance. The wire grid pattern includes a first layer including metal, and a first dielectric stacked layer pattern disposed between the first layer and the base substrate. The first dielectric stacked layer pattern include a first dielectric layer having a high refractive index and a second dielectric layer having a low refractive index.

According to an exemplary embodiment of the present invention, the polarizer may further include a passivation layer disposed on the wire grid pattern. The wire grid pattern further may include a second dielectric stacked layer pattern including a second dielectric layer with a high refractive index and a dielectric layer having a low refractive index.

According to an exemplary embodiment of the present invention, a display panel includes a first substrate, a second substrate facing the first substrate, and a liquid crystal layer between the first substrate and the second substrate. The first substrate includes a first base substrate and a first wire grid pattern disposed on the first base substrate. The first wire grid pattern has a first line width, a first separation distance and a first pitch. The first pitch is a sum of the first line width and the first separation distance. Adjacent grids of the first wire grid pattern are spaced apart by the first separation distance. The second substrate includes a second base substrate and a dielectric stacked layer disposed on the second base substrate. The dielectric stacked layer includes a first dielectric layer with a high refractive index and a second dielectric layer with a low refractive index. A second wire grid pattern disposed on the dielectric stacked layer has a second line width, a second separation distance and a second pitch. The second pitch is a sum of the second line width and the second separation distance. Adjacent grids of the second wire grid pattern are spaced apart by the second separation distance.

According to an exemplary embodiment of the present invention, the display panel may further include a first passivation layer disposed on the first wire grid pattern. The first wire grid pattern of the first substrate may include a first layer comprising metal and a first dielectric stacked layer pattern disposed between the first layer and the base substrate. The first dielectric stacked layer includes a third dielectric layer with a high refractive index and a fourth dielectric layer with a low refractive index. The first wire grid pattern includes a second dielectric stacked layer pattern disposed between the first layer and the passivation layer. The second dielectric stacked layer pattern includes a fifth dielectric layer with a high refractive index and a sixth dielectric layer with a low refractive index.

According to an exemplary embodiment of the present invention, the display panel may further include a second passivation layer disposed on the second wire grid pattern. The second wire grid pattern of the second substrate may include a first layer comprising metal, and a third dielectric stacked layer pattern disposed between the first layer and the second passivation layer. The third dielectric stacked layer may include a seventh dielectric layer with a high refractive index and an eighth dielectric layer with a low refractive index.

According to an exemplary embodiment of the present invention, the first layer of the first wire grid pattern of the first substrate may include aluminum (Al), gold (Au), silver (Ag), copper (Cu), chrome (Cr), steel (Fe), or nickel (Ni). The first wire grid pattern may further include a second layer including molybdenum (Mo), or titanium (Ti). The first layer of the second wire grid pattern of the second substrate may include aluminum (Al), gold (Au), silver (Ag), copper (Cu), chrome (Cr), steel (Fe), or nickel (Ni). The second wire grid pattern may further include a second layer including molybdenum (Mo), or titanium (Ti).

According to an exemplary embodiment of the present invention, the first substrate may further include a black matrix disposed on the second wire grid pattern. The black matrix may be formed in a peripheral area adjacent to a display area displaying an image.

According to an exemplary embodiment of the present invention, the first wire grid pattern of the first substrate may include a pattern having a boundary shape. The boundary shape may be substantially the same as a shape of the black matrix in the peripheral area.

According to an exemplary embodiment of the present invention, the first substrate may further include a red dielectric stacked layer, a green dielectric stacked layer and a blue dielectric stacked layer between the first base substrate and the first wire grid pattern. The red dielectric stacked layer may be disposed corresponding to a red pixel area which displays red light. The red dielectric stacked layer may include a dielectric layer with a high refractive index and a dielectric layer with a low refractive index. The dielectric layers of the red dielectric stacked layer are configured to pass the red light. The green dielectric stacked layer may be disposed corresponding to a green pixel are which displays green light. The green dielectric stacked layer may include a dielectric layer with a high refractive index and a dielectric layer with a low refractive index. The dielectric layers of the green dielectric stacked layer are configured to pass the green light. The blue dielectric stacked layer may be disposed corresponding to a blue pixel area which displays blue light. The blue dielectric stacked layer may include a dielectric layer with a high refractive index and a dielectric layer with a low refractive index. The dielectric layers of the blue dielectric stacked layer are configured to pass the blue light.

According to an exemplary embodiment of the present invention, the second substrate may further include a red color filter, a green color filter and a blue color filter disposed on the second wire grid pattern. The red color filter may correspond to the red dielectric stacked layer. The green color filter may correspond to the green dielectric stacked layer. The blue color filter may correspond to the blue dielectric stacked layer.

According to an exemplary embodiment of the present invention, a display panel includes a first substrate, a second substrate facing the first substrate and a light crystal layer between the first substrate and the second substrate. The first substrate includes a first base substrate, and a first wire grid pattern disposed on the first base substrate. The first wire grid pattern has a first line width, a first separation distance and a first pitch. The first pitch is a sum of the first line width and the first separation distance. Adjacent grids of the first wire grid pattern are spaced apart by the first separation distance. The second substrate includes a second base substrate, and a second wire grid pattern disposed on the second base substrate. The second wire grid pattern has a second line width, a second separation distance and a second pitch. A dielectric stacked layer is disposed on the second base substrate opposite to the second wire grid pattern. The dielectric stacked layer includes a dielectric layer with a high refractive index and a dielectric layer with a low refractive index. The display panel includes a liquid crystal layer disposed between the first substrate and the second substrate.

According to an exemplary embodiment of the present invention, the first wire grid pattern may include a first layer formed of metal. The first wire grid pattern of the first substrate may include a first dielectric stacked layer pattern including a dielectric layer with a high refractive index and a dielectric layer with a low refractive index.

According to an exemplary embodiment of the present invention, a method of manufacturing a polarizer includes forming a dielectric stacked layer by stacking a dielectric layer with a high refractive index and a dielectric layer with a low refractive index. The method of manufacturing a polarizer includes forming a first metal layer including aluminum (Al), gold (Au), silver (Ag), copper (Cu), chrome (Cr), steel (Fe), or nickel (Ni) and forming a second metal layer including a second layer including molybdenum (Mo), or titanium (Ti). The method of manufacturing a polarizer includes forming a hard mask on the second metal layer, and forming a polymer layer on the hard mask. The method of manufacturing a polarizer includes forming a patterned polymer layer by pressing a mold onto the polymer layer to form a pattern corresponding to a wire grid pattern on the polymer layer and exposing the second metal layer by removing a portion of the patterned polymer layer and the hard mask. The method of manufacturing a polarizer includes forming a wire grid pattern by removing the second and first metal layers and removing the remaining polymer layer and the remaining hard mask.

According to an exemplary embodiment of the present invention, the method may further include forming a photoresist on the patterned polymer layer corresponding to a peripheral area adjacent to a display area before forming the wire grid pattern. The display area may be configured to display an image.

According to exemplary embodiments of the present invention, the Method may further include forming a photoresist on the polymer layer corresponding to a peripheral area adjacent to a display area before forming the wire grid pattern. The display area may be configured to display an image.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EXEMPLARY EMBODIMENTS

Hereinafter, exemplary embodiments of the present the invention will be explained in detail with reference to the accompanying drawings.

Figure 1:
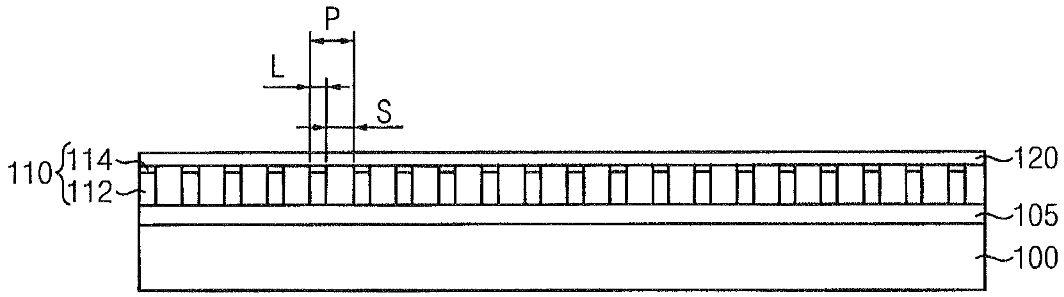
FIG. 1 is a cross-sectional view illustrating a polarizer according to an exemplary embodiment of the present invention.

FIG. 1 is a cross-sectional view illustrating a polarizer according to an exemplary embodiment of the present invention.

Referring to FIG. 1, a polarizer includes a base substrate 100, a dielectric stacked layer 105, a wire grid pattern 110 and a passivation layer 120.

The base substrate 100 may include a material which has relatively high transmittance, thermal resistance, and chemical resistance. For example, the base substrate 100 may include glass, polyethylenenaphthalate, polyethylene terephthalate, polyacryl or a mixture thereof.

The dielectric stacked layer 105 is disposed on the base substrate 100. The dielectric stacked layer 105 may include dielectric layers having a relatively high refractive index and dielectric layers having a relatively low refractive index, which may be alternately stacked. The dielectric stacked layer 105 may selectively pass a specific wavelength range of light through the base substrate 100 toward the wire grid pattern 110. The dielectric stacked layer 105 may include dielectric layers having a relatively high refractive index and dielectric layers having a relatively low refractive index, which may be alternately stacked, so that the specific wavelength range of light may be selectively passed due to reflection or destructive interference on boundary interfaces of the dielectric layers.

The dielectric stacked layer 105 may have a desired thickness and have a desired number of dielectric layers according to a wavelength range of light passing the dielectric stacked layer 105. A more detailed explanation of the dielectric stacked layer 105 will be described in detail in FIGS. 2A and 2B.

The wire grid pattern 110 is disposed on the dielectric stacked layer 105. The wire grid pattern 110 has a line width L, a separation distance S and a pitch P. The pitch P is a sum of the line width L and the separation distance S. Adjacent grids of the wire grid pattern 110 may be spaced apart by the separation distance S.

The separation distance S, which light may pass therethrough, may be smaller than a wavelength of an incident light to polarize the incident light. For example, when the incident light is a visible light, the wavelength of the incident light is about 400 nm to about 700 nm, so that the separation distance S may be smaller than about 400 nm. For example, a thickness of the wire grid pattern 110 may be about 150 nm, and the pitch P may be about 100 nm.

The wire grid pattern 110 may include a first layer 112 and a second layer 114 disposed on the first layer 112. The first layer 112 may include aluminum (Al), gold (Au), silver (Ag), copper (Cu), chrome (Cr), steel (Fe) or nickel (Ni) or a mixture thereof. The second layer 114 may include molybdenum (Mo) and/or titanium (Ti).

The passivation layer 120 is disposed on the wire grid pattern 110. The passivation layer 120 may have a film shape. The passivation layer 120 may protect the wire grid pattern 110, and maintain air filled between the grids of the wire grid pattern 110.

Figure 2A:
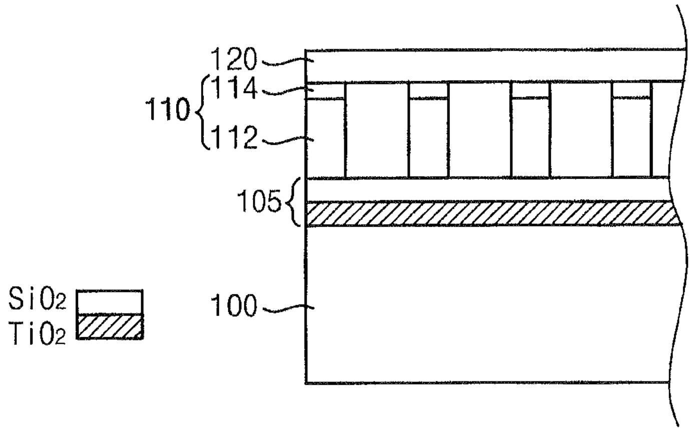
FIG. 2A is a cross-sectional view illustrating an exemplary embodiment of a dielectric stacked layer of the polarizer of FIG. 1.

FIG. 2A is a cross-sectional view illustrating an exemplary embodiment of a dielectric stacked layer of the polarizer of FIG. 1.

Referring to FIG. 2A, a polarizer includes a base substrate 100, a dielectric stacked layer 105, a wire grid pattern 110 and a passivation layer 120. The wire grid pattern 110 may include a first layer 112 and a second layer 114.

The dielectric stacked layer 105 may include one or more dielectric layers having a relatively high refractive index and one or more dielectric layers having a relatively low refractive index, which may be alternately stacked. The dielectric stacked layer 105 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm. For example, a pitch (e.g., P of FIG. 1) of the wire grid pattern 110 may be less than about 120 nm, and a thickness of the wire grid pattern 110 may be about 150 nm.

The dielectric stacked layer 105 may reflect light proceeding through the base substrate 100 toward the wire grid pattern 110.

Figure 2B:
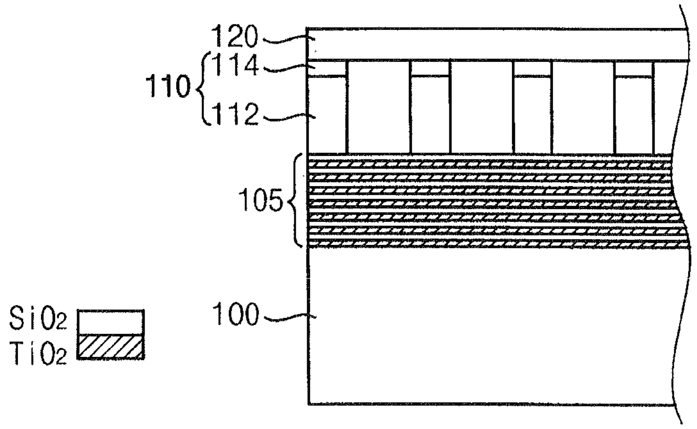
FIG. 2B is a cross-sectional view illustrating an exemplary embodiment of a dielectric stacked layer of the polarizer of FIG. 1.

FIG. 2B is a cross-sectional view illustrating an exemplary embodiment of a dielectric stacked layer of the polarizer of FIG. 1.

Referring to FIG. 2B, a polarizer includes a base substrate 100, a dielectric stacked layer 105, a wire grid pattern 110 and a passivation layer 120. The wire grid pattern 110 may include a first layer 112 and a second layer 114.

The dielectric stacked layer 105 may include dielectric layers having a relatively high refractive index and dielectric layers having a relatively low refractive index, which may be alternately stacked. The dielectric stacked layer 105 may includes a TiO2 layer formed of titanium dioxide (TiO2), and a SiO2 layer disposed on the TiO2 layer and formed of silicon dioxide (SiO2). Another TiO2 layer formed of titanium dioxide (TiO2) may be disposed on the SiO2 layer. Thus, a plurality of TiO2 layers and a plurality of SiO2 layers may be alternately stacked. The TiO2 layers may have a refractive index of about 1.49, and the SiO2 layers may have a refractive index of about 2.95. The TiO2 layers and the SiO2 layers may be alternately stacked seven times. Thicknesses of the TiO2 and SiO2 layers may be about 20 nm, about 50 nm, about 20 nm, about 50 nm, about 20 nm, about 40 nm, about 20 nm, about 30 nm, about 20 nm, about 30 nm, about 20 nm, about 30 nm, about 20 nm and about 20 nm from the base substrate 100 in order. For example, a pitch (e.g., P of FIG. 1) of the wire grid pattern 110 may be about 100 nm, and a thickness of the wire grid pattern 110 may be about 150 nm.

The dielectric stacked layer 105 may reflect light having a specific wavelength range. For example, the polarizer may be used for a liquid crystal display apparatus to reflect ultraviolet rays, so that the ultraviolet rays cannot pass the polarizer. Thus, changes to a property of liquid crystal molecules in the liquid crystal display apparatus due to the ultraviolet rays may be decreased.

Figure 3:
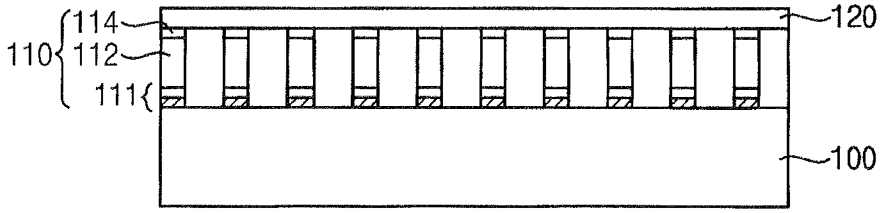
FIG. 3 is a cross-sectional view illustrating a polarizer according to an exemplary embodiment of the present invention.

FIG. 3 is a cross-sectional view illustrating a polarizer according to an exemplary embodiment of the present invention.

Referring to FIG. 3, a polarizer may include a base substrate 100, a wire grid pattern 110 and a passivation layer 120.

The base substrate 100 may include a material which has relatively high transmittance, thermal resistance, and chemical resistance. For example, the base substrate 100 may include glass, polyethylenenaphthalate, polyethylene terephthalate, polyacryl or a mixture thereof.

The wire grid pattern 110 may be disposed on the base substrate 100. The wire grid pattern 110 may have a line width (e.g., L of FIG. 1), a separation distance (e.g., S of FIG. 1) and a pitch (e.g., P of FIG. 1). The pitch P may be a sum of the line width L and the separation distance S. Adjacent grids of the wire grid pattern 110 may spaced apart by the separation distance S.

The wire grid pattern 110 may include a first dielectric stacked layer pattern 111, a first layer 112 disposed on the first dielectric stacked pattern 111, and a second layer 114 disposed on the first layer 112.

The first dielectric stacked layer pattern 111 may include a dielectric layer having a relatively high refractive index and a dielectric layer having a relatively low refractive index, which may be alternately stacked. The first dielectric stacked layer pattern 111 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm. For example, a pitch (e.g., P of FIG. 1) of the wire grid pattern 110 may be less than about 120 nm, and a sum of a thickness of the first layer 112 and the second layer 114 of the wire grid pattern 110 may be about 150 nm.

The first dielectric stacked layer pattern 111 may reflect light proceeding through the base substrate 100 toward the wire grid pattern 110.

The first layer 112 may be disposed on the first dielectric stacked layer pattern 111. The second layer 114 may be disposed on the first layer 112. For example, the first layer 112 may include aluminum (Al), gold (Au), silver (Ag), copper (Cu), chrome (Cr), steel (Fe) or nickel (Ni) or a mixture thereof. The second layer 114 may include molybdenum (Mo) and/or titanium (Ti).

The passivation layer 120 may be disposed on the wire grid pattern 110. The passivation layer 120 may have a film shape. The passivation layer 120 may protect the wire grid pattern 110, and may maintain air filled between the grids of the wire grid pattern 110.

Figure 4:
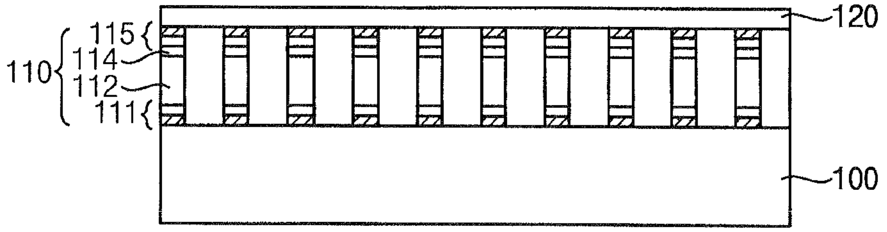
FIG. 4 is a cross-sectional view illustrating a polarizer according to an exemplary embodiment of the present invention.

FIG. 4 is a cross-sectional view illustrating a polarizer according to an exemplary embodiment of the present invention.

Referring to FIG. 4, a polarizer may include a base substrate 100, a wire grid pattern 110 and a passivation layer 120.

The base substrate 100 may include a material which has relatively high transmittance, thermal resistance, and chemical resistance. For example, the base substrate 100 may include glass, polyethylenenaphthalate, polyethylene terephthalate, polyacryl or a mixture thereof.

The wire grid pattern 110 may be disposed on the base substrate 100. The wire grid pattern 110 has a line width (e.g., L of FIG. 1), a separation distance (e.g., S of FIG. 1) and a pitch (e.g., P of FIG. 1). The pitch P may be a sum of the line width L and the separation distance S. Adjacent grids of the wire grid pattern 110 may be spaced apart by the separation distance S.

The wire grid pattern 110 may include a first dielectric stacked layer pattern 111, a first layer 112 disposed on the first dielectric stacked pattern 111, a second layer 114 disposed on the first layer 112, and a second dielectric stacked layer pattern 115 disposed on the second layer 114.

The first dielectric stacked layer pattern 111 may include a dielectric layer having a relatively high refractive index and a dielectric layer having a relatively low refractive index, which may be alternately stacked. The first dielectric stacked layer pattern 111 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm. For example, a pitch (e.g., P of FIG. 1) of the wire grid pattern 110 may be less than about 120 nm, and a sum of a thickness of the first layer 112 and the second layer 114 of the wire grid pattern 110 may be about 150 nm.

The first dielectric stacked layer pattern 111 may reflect light proceeding through the base substrate 100 toward the wire grid pattern 110.

The first layer 112 may be disposed on the dielectric stacked layer pattern 111. The second layer 114 may be disposed on the first layer 112. For example, the first layer 112 may include aluminum (Al), gold (Au), silver (Ag), copper (Cu), chrome (Cr), steel (Fe) or nickel (Ni) or a mixture thereof. The second layer 114 may include molybdenum (Mo) and/or titanium (Ti).

The second dielectric stacked layer pattern 115 may include a dielectric layer having a relatively high refractive index and a dielectric layer having a relatively low refractive index, which may be alternately stacked. The second dielectric stacked layer pattern 115 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm.

The second dielectric stacked layer pattern 115 may reflect light proceeding through the base substrate 100 toward the wire grid pattern 110.

The passivation layer 120 may be disposed on the wire grid pattern 110. The passivation layer 120 may have a film shape. The passivation layer 120 may protect the wire grid pattern 110, and maintain air filled between the grids of the wire grid pattern 110.

Figure 5:
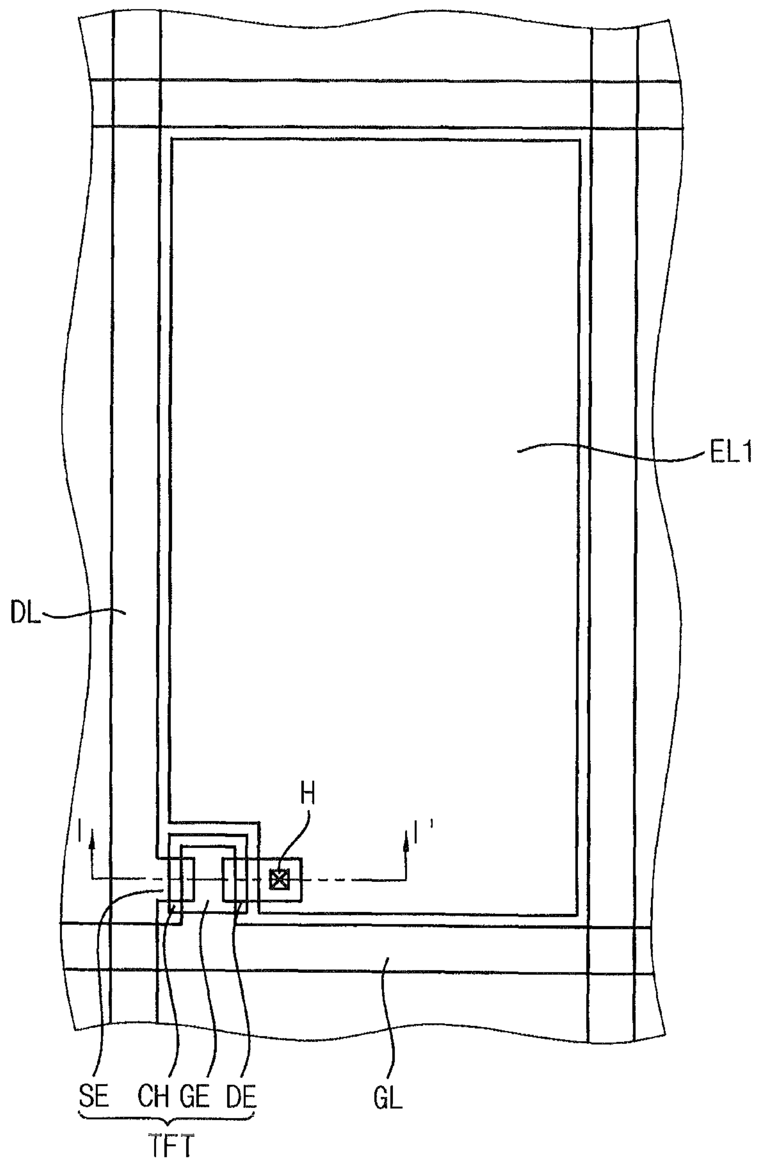
FIG. 5 is a plan view illustrating a display panel according to an exemplary embodiment of the present invention.
Figure 6:
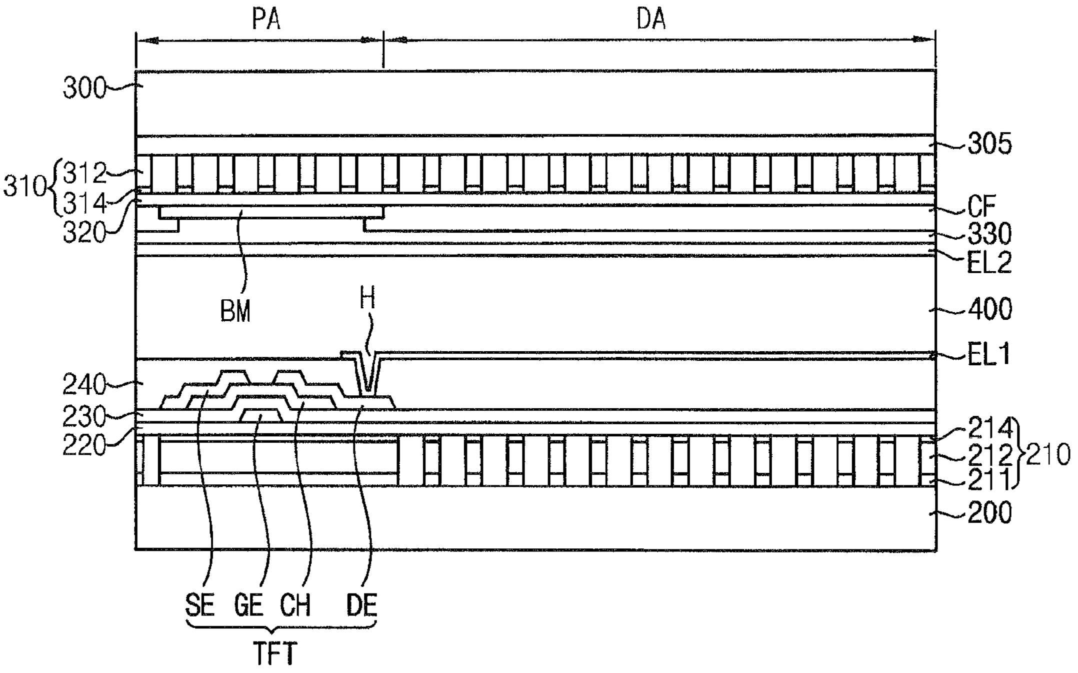
FIG. 6 is a cross-sectional view taken along a line I-I' of FIG. 5.

FIG. 5 is a plan view illustrating a display panel according to an exemplary embodiment of the present invention. FIG. 6 is a cross-sectional view taken along a line IT of FIG. 5.

Referring to FIGS. 5 and 6, a display panel may include a first substrate, a second substrate facing the first substrate, and a liquid crystal layer 400 disposed between the first substrate and the second substrate.

The first substrate may include a first base substrate 200, a first wire grid pattern 210, a first passivation layer 220, a thin film transistor TFT, a first insulation layer 230, a second insulation layer 240 and a first electrode EL1.

The first base substrate 200 may include a material which has relatively high transmittance, thermal resistance, and chemical resistance. For example, the first base substrate 200 may include glass, polyethylenenaphthalate, polyethylene terephthalate, polyacryl or a mixture thereof.

The first wire grid pattern 210 may be disposed on the first base substrate 200. The first wire grid pattern 210 may have a line width (e.g., L of FIG. 1), a separation distance (e.g., S of FIG. 1) and a pitch (e.g., P of FIG. 1). The pitch P may be a sum of the line width L and the separation distance S. Adjacent grids of the first wire grid pattern 210 may be spaced apart by the separation distance S. For example, a thickness of the first wire grid pattern 210 may be about 150 nm, and the pitch P may be about 100 nm.

The first wire grid pattern 210 may include a first dielectric stacked layer pattern 211, a first layer 212 disposed on the first dielectric stacked pattern 211, and a second layer 214 disposed on the first layer 212.

The first dielectric stacked layer pattern 211 may include a dielectric layer having a relatively high refractive index and a dielectric layer having a relatively low refractive index, which may be alternately stacked. The first dielectric stacked layer pattern 211 may reflect light proceeding through the first base substrate 200 toward the wire grid pattern 210. A more detailed explanation of the first dielectric stacked layer pattern 211 will be described in detail in FIG. 8.

The first layer 212 may be disposed on the first dielectric stacked layer pattern 211. The second layer 214 may be disposed on the first layer 212. For example, the first layer 212 may include aluminum (Al), gold (Au), silver (Ag), copper (Cu), chrome (Cr), steel (Fe) or nickel (Ni) or a mixture thereof. The second layer 214 may include molybdenum (Mo) and/or titanium (Ti).

A wire grid pattern may be formed corresponding to a display area DA configured to display an image. A pattern including a dielectric stacked layer, a first layer and a second layer may be formed corresponding to a peripheral area PA adjacent to the display area DA. The peripheral area PA might not display an image. For example, a pattern having a boundary shape consistent with that of a black matrix BM of the second substrate, which will be described later, may be formed corresponding to the peripheral area PA, and the wire grid pattern may be formed corresponding to the display area DA.

Light from a backlight unit (not shown), which may be disposed under the display panel of a display apparatus may partially pass through and may be polarized by the wire grid pattern in the display area DA, and may be partially reflected by the first dielectric stacked layer pattern 211 or the first layer 212 toward the backlight unit. The light may be reflected by the dielectric stacked layer and the first layer in the peripheral area PA toward the backlight unit. The light which reflected toward the backlight unit may be reflected again on a reflective plate (not shown) disposed under the backlight unit. Thus, light efficiency of the display apparatus may be increased.

The first passivation layer 220 may be disposed on the first wire grid pattern 210. The first passivation layer 220 may have a film shape. The first passivation layer 220 may protect the first wire grid pattern 210, and may maintain air filled between the grids of the first wire grid pattern 210.

A gate line GL and a gate electrode GE may be disposed on the first passivation layer 220. The gate line GL and the gate electrode GE may be formed in the peripheral area PA. The gate electrode GE may be electrically connected to the gate line GL.

The first insulation layer 230 may be disposed on the first passivation layer 220 on which the gate electrode GE and the gate line GL may be disposed. The first insulation layer 230 may include one or more inorganic materials such as, for example, silicon oxide (SiOx) and/or silicon nitride (SiNx).

A channel layer CH may be disposed on the first insulation layer 230 to overlap the gate electrode GE. The channel layer CH may include a semiconductor layer consisting of amorphous silicon (a-Si:H) and an ohmic contact layer consisting of n+ amorphous silicon (n+ a-Si:H). For example, the channel layer CH may include an oxide semiconductor. For example, the oxide semiconductor may include an amorphous oxide including indium (In), zinc (Zn), gallium (Ga), tin (Sn) and/or hafnium (Hf). For example, the oxide semiconductor may consist of an amorphous oxide including indium (In), zinc (Zn) and/or gallium (Ga), or an amorphous oxide including indium (In), zinc (Zn) and/or hafnium (Hf). The oxide semiconductor may include an oxide such as indium zinc oxide (InZnO), indium gallium oxide (InGaO), indium tin oxide (InSnO), zinc tin oxide (ZnSnO), gallium tin oxide (GaSnO) and/or gallium zinc oxide (GaZnO).

A data line DL crossing the gate line GL may be disposed on the first insulation layer 230.

A source electrode SE and a drain electrode DE may be disposed on the channel layer CH. The source electrode SE may be electrically connected to the data line DL, and may be spaced apart from the drain electrode DE. The drain electrode DE may be electrically connected to the first electrode EL1 through a contact hole H.

The gate electrode GE, the source electrode SE, the drain electrode DE and the channel layer CH may form the thin film transistor TFT in the peripheral area PA.

The second insulation layer 240 may be disposed on the thin film transistor TFT and the first insulation layer 230 on which the data line DL is formed. The second insulation layer 240 may include one or more inorganic materials such as, for example, silicon oxide (SiOx) and/or silicon nitride (SiNx). For example, the second insulation layer 240 may include an organic insulation material having relatively low permittivity. For example, the second insulation layer 240 may have a double layer structure of inorganic and organic insulating layers. The second insulation layer 240 may include the contact hole H exposing a portion of the drain electrode DE.

The first electrode EL1 may be disposed on the second insulation layer 240. The first electrode EL1 may correspond with the display area DA. The first electrode EL1 may be electrically connected to the drain electrode DE of the thin film transistor TFT through the contact hole H. The first electrode EL1 may include a transparent conductive material, such as, for example, indium tin oxide (ITO), indium zinc oxide (IZO), and the like. Although not shown in figures, the first electrode EL1 may include a slit pattern having a plurality of openings.

The second substrate may include a second base substrate 300, a dielectric stacked layer 305, a second wire grid pattern 310, a second passivation layer 320, a black matrix BM, a color filter CF, an over-coating layer 330 and a second electrode EL2.

The second base substrate 300 may include a material which has relatively high transmittance, thermal resistance, and chemical resistance. For example, the second base substrate 300 may include glass, polyethylenenaphthalate, polyethylene terephthalate, polyacryl or a mixture thereof.

The dielectric stacked layer 305 may be disposed on the second base substrate 300. The dielectric stacked layer 305 may include dielectric layers having a relatively high refractive index and dielectric layers having a relatively low refractive index, which may be alternately stacked. The dielectric stacked layer 305 may selectively pass a specific wavelength range of light having passed through the second base substrate 300 toward the second wire grid pattern 310. The dielectric stacked layer 305 may include dielectric layers having a relatively high refractive index and dielectric layers having a relatively low refractive index, which may be alternately stacked, so that the desired wavelength range of light may be selectively passed due to reflection or destructive interference on boundary interfaces of the dielectric layers.

The dielectric stacked layer 305 may have a desired thickness and a desired number of dielectric layers according to wavelength range of light passing the dielectric stacked layer 305. The dielectric stacked layer 305 may be substantially the same as a dielectric stacked layer 105 of FIG. 2A or 2B.

The second wire grid pattern 310 may be disposed on the dielectric stacked layer 305. The second wire grid pattern 310 may have a line width (e.g., L of FIG. 1), a separation distance (e.g., S of FIG. 1) and a pitch (e.g., P of FIG. 1). The pitch P may be a sum of the line width L and the separation distance S. Adjacent grids of the second wire grid pattern 310 may be spaced apart by the separation distance S. For example, a thickness of the second wire grid pattern 310 may be about 150 nm, and the pitch P may be about 100 nm.

The second wire grid pattern 310 may include a first layer 312 and a second layer 314 disposed on the first layer 312. For example, the first layer 312 may include aluminum (Al), gold (Au), silver (Ag), copper (Cu), chrome (Cr), steel (Fe) or nickel (Ni) or a mixture thereof. The second layer 314 may include molybdenum (Mo) and/or titanium (Ti).

The second passivation layer 320 may be disposed on the second wire grid pattern 310. The second passivation layer 320 may have a film shape. The second passivation layer 320 may protect the second wire grid pattern 310, and may maintain air filled between the grids of the second wire grid pattern 310.

The black matrix BM may be disposed on the second passivation layer 320. The black matrix BM may be disposed in the peripheral area PA, and the black matrix BM may block light. Thus, the black matrix BM may overlap the data line DL, the gate line GL, and the thin film transistor TFT.

The color filter CF may be disposed in the display area DA and on the second passivation layer 320 on which the black matrix BM may be formed. The color filter CF may supply colors to the light passing through the liquid crystal layer 400. The color filter CF may include, for example, a red color filter, a green color filter or a blue color filter. The color filter CF may correspond to a pixel area. Color filters adjacent to each other may have different colors. The color filter CF may be overlapped with an adjacent color filter CF in a boundary of the pixel area. For example, the color filter CF may be spaced apart from the adjacent color filter CF in the boundary of the pixel area.

The over-coating layer 330 may be disposed on the color filter CF and the black matrix BM. The over-coating layer 330 may flatten the color filter CF, protect the color filter CF, and insulate the color filter CF. The over-coating layer 330 may include an acrylic-epoxy material.

The second electrode EL2 may be disposed on the over-coating layer 330. The second electrode EL2 may correspond to both the display area DA and the peripheral area PA. The second electrode EL2 may correspond to the display area DA and not to the peripheral area PA. The second electrode EL2 may include a transparent conductive material, such as, for example, indium tin oxide (ITO), indium zinc oxide (IZO) and etc.

The liquid crystal layer 400 may be disposed between the first substrate and the second substrate. The liquid crystal layer 400 may include liquid crystal molecules having optical anisotropy. The liquid crystal molecules may be driven by an electric field, so that an image is displayed by passing light through or blocking light from passing through the liquid crystal layer 400.

Figure 7A:
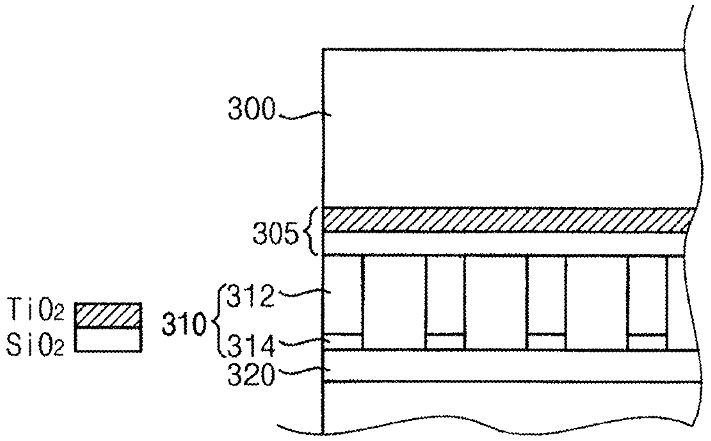
FIG. 7A is a cross-sectional view illustrating an exemplary embodiment of a dielectric stacked layer of the display panel of FIG. 5.

FIG. 7A is a cross-sectional view illustrating an exemplary embodiment of a dielectric stacked layer of the display panel of FIG. 5.

Referring to FIG. 7A, a display panel may include a second base substrate 300, a dielectric stacked layer 305, a second wire grid pattern 310 and a second passivation layer 320. The second wire grid pattern 310 may include a first layer 312 and a second layer 314.

The dielectric stacked layer 305 may include a dielectric layer having a relatively high refractive index and a dielectric layer having a relatively low refractive index, which may be alternately stacked. The dielectric stacked layer 305 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm. For example, a pitch (e.g., P of FIG. 1) of the second wire grid pattern 310 may be about 100 nm, and a thickness of the second wire grid pattern 310 may be about 150 nm.

Figure 7B:
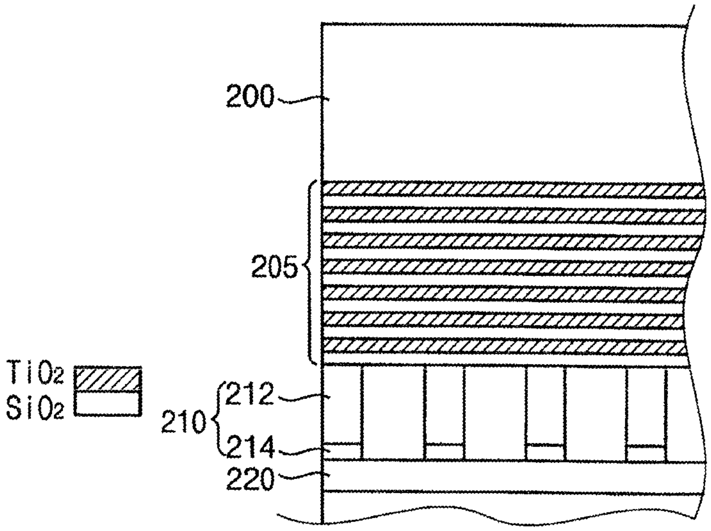
FIG. 7B is a cross-sectional view illustrating an exemplary embodiment of a dielectric stacked layer of the display panel of FIG. 5.

FIG. 7B is a cross-sectional view illustrating an exemplary embodiment of a dielectric stacked layer of the display panel of FIG. 5.

Referring to FIG. 7B, a display panel may include a first base substrate 200, a dielectric stacked layer 205, a first wire grid pattern 210 and a first passivation layer 220.

The first wire grid pattern 210 may include a first layer 212 and a second layer 214.

The dielectric stacked layer 205 may include dielectric layers having a relatively high refractive index and dielectric layers having a relatively low refractive index, which may be alternately stacked. The dielectric stacked layer 105 may include a TiO2 layer formed of titanium dioxide (TiO2), and a SiO2 layer disposed on the TiO2 layer and formed of silicon dioxide (SiO2). Another TiO2 layer formed of titanium dioxide (TiO2) may be disposed on the SiO2 layer. Thus, a plurality of TiO2 layers and a plurality of SiO2 layers may be alternately stacked. The TiO2 layers may have a refractive index of about 1.49, and the SiO2 layers may have a refractive index of about 2.95. The TiO2 layers and the SiO2 layers may be alternately stacked seven times. Thicknesses of the TiO2 and SiO2 layers may be about 20 nm, about 50 nm, about 20 nm, about 50 nm, about 20 nm, about 40 nm, about 20 nm, about 30 nm, about 20 nm, about 30 nm, about 20 nm, about 30 nm, about 20 nm and about 20 nm from the second base substrate 300 in order. For example, a pitch (e.g., P of FIG. 1) of the first wire grid pattern 210 may be about 100 nm, and a thickness of the first wire grid pattern 210 may be about 150 nm.

Figure 8:
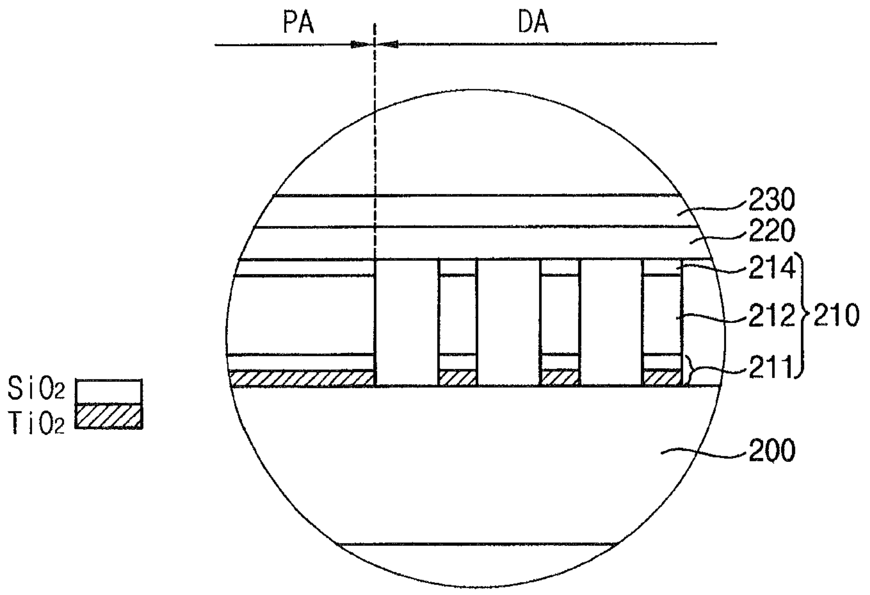
FIG. 8 is a cross-sectional view illustrating an exemplary embodiment of a lower dielectric stacked pattern of the display panel of FIG. 5.

FIG. 8 is a detailed cross-sectional view illustrating an exemplary embodiment of a lower dielectric stacked pattern of the display panel of FIG. 5.

Referring to FIG. 8, a display panel may include a first base substrate 200, a first wire grid pattern 210, a first passivation layer 220 and a first insulation layer 230.

The first wire grid pattern 210 may include a first dielectric stacked layer pattern 211, a first layer 212 disposed on the first dielectric stacked pattern 211, and a second layer 214 disposed on the first layer 212.

The first dielectric stacked layer pattern 211 may include a dielectric layer having a relatively high refractive index and a dielectric layer having a relatively low refractive index, which may be alternately stacked. The first dielectric stacked layer pattern 211 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm. For example, a pitch (e.g., P of FIG. 1) of the first wire grid pattern 210 may be less than about 120 nm, and a sum of a thickness of the first layer 212 and the second layer 214 of the first wire grid pattern 210 may be about 150 nm.

The first dielectric stacked layer pattern 211 may reflect light having passed through the base substrate 200 toward the first wire grid pattern 210.

A wire grid pattern may be formed corresponding to a display area DA configured to display an image. A pattern including a dielectric stacked layer, a first layer and a second layer may be formed corresponding to a peripheral area PA adjacent to the display area DA. The peripheral area might not be configured to display the image. For example, the pattern having a boundary shape according to that of a black matrix BM of the second substrate, which will be described later, may be formed corresponding to the peripheral area PA, and the wire grid pattern may be formed corresponding to the display area DA.

Figure 9:
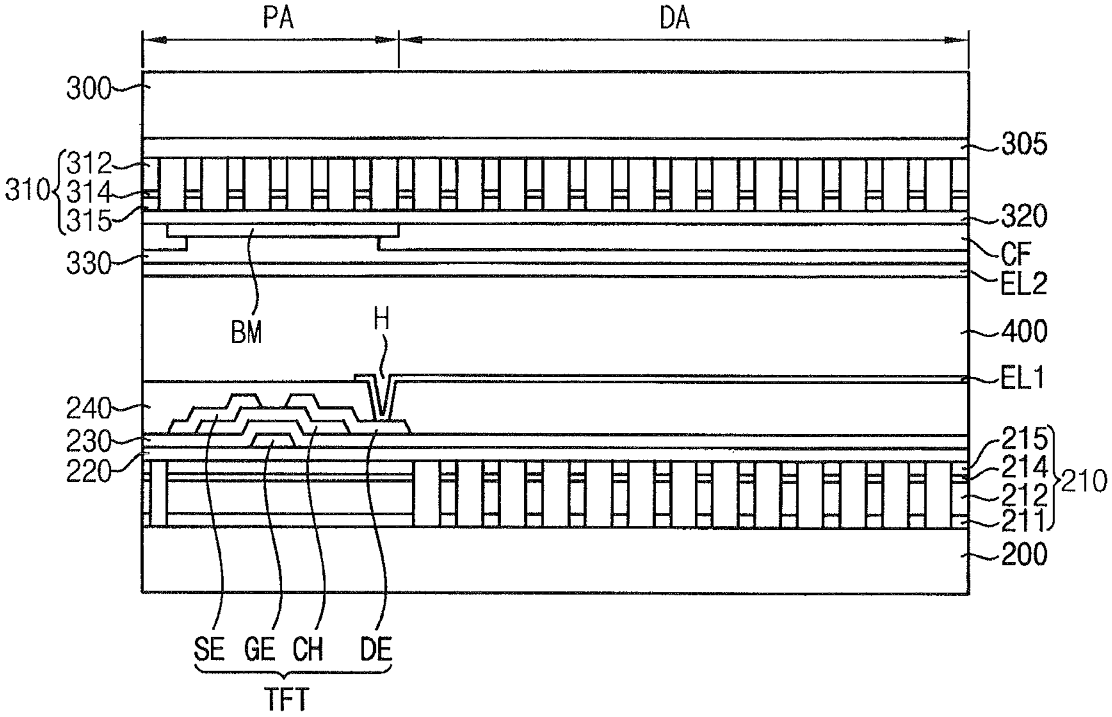
FIG. 9 is a cross-sectional view illustrating a display panel according to an exemplary embodiment of the present invention.

FIG. 9 is a cross-sectional view illustrating a display panel according to an exemplary embodiment of the present invention.

Referring to FIG. 9, a display panel may include a first substrate, a second substrate facing the first substrate, and a liquid crystal layer 400 disposed between the first substrate and the second substrate.

The first substrate may include a first base substrate 200, a first wire grid pattern 210, a first passivation layer 220, a thin film transistor TFT, a first insulation layer 230, a second insulation layer 240 and a first electrode EL1.

The first base substrate 200 may include a material which has relatively high transmittance, thermal resistance, and chemical resistance. For example, the first base substrate 200 may include glass, polyethylenenaphthalate, polyethylene terephthalate, polyacryl or a mixture thereof.

The first wire grid pattern 210 may be disposed on the first base substrate 200. The first wire grid pattern 210 may have a line width (e.g., L of FIG. 1), a separation distance (e.g., S of FIG. 1) and a pitch (e.g., P of FIG. 1). The pitch P may be a sum of the line width L and the separation distance S. Adjacent grids of the first wire grid pattern 210 may be spaced apart by the separation distance S. For example, a thickness of the first wire grid pattern 210 may be about 150 nm, and the pitch P may be about 100 nm.

The first wire grid pattern 210 may include a first dielectric stacked layer pattern 211, a first layer 212 disposed on the first dielectric stacked pattern 211, a second layer 214 disposed on the first layer 212 and a second dielectric stacked layer pattern 215.

The first dielectric stacked layer pattern 211 may include a dielectric layer having a relatively high refractive index and a dielectric layer having a relatively low refractive index, which may be alternately stacked. The first dielectric stacked layer pattern 211 may reflect light having passed through the base substrate 200 toward the wire grid pattern 210. A more detailed explanation of the first dielectric stacked layer pattern 211 will be described in detail with reference to FIG. 11.

The first layer 212 may be disposed on the first dielectric stacked layer pattern 211. The second layer 214 may be dispose on the first layer 212. For example, the first layer 212 may include aluminum (Al), gold (Au), silver (Ag), copper (Cu), chrome (Cr), steel (Fe) or nickel (Ni) or a mixture thereof. The second layer 214 may include molybdenum (Mo) and/or titanium (Ti).

The second dielectric stacked layer pattern 215 may include a dielectric layer having a relatively high refractive index and a dielectric layer having a relatively low refractive index, which may be alternately stacked. The second dielectric stacked layer pattern 215 may reflect light having passed through the liquid crystal layer 400. Thus, light efficiency of transflective or reflective type liquid crystal display apparatus may be increased. A more detailed explanation of the second dielectric stacked layer pattern 215 will be described in detail with reference to FIG. 11.

A wire grid pattern may be formed corresponding to a display area DA for displaying an image. A pattern including a first dielectric stacked layer, a first layer, a second layer and a second dielectric stacked layer may be formed corresponding to a peripheral area PA adjacent to the display area DA. The peripheral area PA might not display an image. For example, the pattern having a boundary shape corresponding to that of a black matrix BM of the second substrate, which will be described later, may be formed corresponding to the peripheral area PA, and the wire grid pattern may be formed corresponding to the display area DA.

Light from a backlight unit (not shown), which may be disposed under the display panel of a display apparatus may partially pass through and be polarized by the wire grid pattern in the display area DA, and may be partially reflected by the first dielectric stacked layer pattern 211 or the first layer 212 toward the backlight unit. The light may be reflected by the first dielectric stacked layer and the first layer in the peripheral area PA toward the backlight unit. The light which reflected toward the backlight unit may be reflected again on a reflective plate (not shown) disposed under the backlight unit. Thus, light efficiency of the display apparatus may be increased.

The first passivation layer 220 may be disposed on the first wire grid pattern 210. The first passivation layer 220 may have a film shape. The first passivation layer 220 may protect the first wire grid pattern 210, and maintain air filled between the grids of the first wire grid pattern 210.

A gate electrode GE may be disposed on the first passivation layer 220. The gate electrode GE may be formed in the peripheral area PA. The gate electrode GE may be electrically connected to the gate line (e.g., GL of FIG. 1).

The first insulation layer 230 may be disposed on the first passivation layer 220 on which the gate electrode GE and the gate line are disposed. The first insulation layer 230 may include one or more inorganic materials such as, for example, silicon oxide (SiOx) and/or silicon nitride (SiNx).

A channel layer CH may be disposed on the first insulation layer 230 to overlap the gate electrode GE. The channel layer CH may include a semiconductor layer consisting of amorphous silicon (a-Si:H) and an ohmic contact layer consisting of n+ amorphous silicon (n+ a-Si:H). For example, the channel layer CH may include an oxide semiconductor. For example, the oxide semiconductor may include an amorphous oxide including indium (In), zinc (Zn), gallium (Ga), tin (Sn) and/or hafnium (Hf). For example, the oxide semiconductor may be consist of an amorphous oxide including indium (In), zinc (Zn) and/or gallium (Ga), or an amorphous oxide including indium (In), zinc (Zn) and/or hafnium (Hf). The oxide semiconductor may include an oxide such as indium zinc oxide (InZnO), indium gallium oxide (InGaO), indium tin oxide (InSnO), zinc tin oxide (ZnSnO), gallium tin oxide (GaSnO) and/or gallium zinc oxide (GaZnO).

A data line (e.g., DL of FIG. 1) crossing the gate line may be disposed on the first insulation layer 230

A source electrode SE and a drain electrode DE may be disposed on the channel layer CH. The source electrode SE may be electrically connected to the data line DL, and spaced apart from the drain electrode DE. The drain electrode DE may be electrically connected to the first electrode EL1 through a contact hole H.

The gate electrode GE, the source electrode SE, the drain electrode DE and the channel layer CH may form the thin film transistor TFT in the peripheral area PA.

The second insulation layer 240 may be disposed on the thin film transistor TFT and the first insulation layer 230 on which the data line DL is formed. The second insulation layer 240 may include one or more inorganic materials such as, for example, silicon oxide (SiOx) and/or silicon nitride (SiNx). For example, the second insulation layer 240 may include organic insulating material having relatively low permittivity. For example, the second insulation layer 240 may have a double layer structure of inorganic and organic insulating layers. The second insulation layer 240 may include the contact hole H exposing a portion of the drain electrode DE.

The first electrode EL1 may be disposed on the second insulation layer 240. The first electrode EL1 may correspond to the display area DA. The first electrode EL1 may be electrically connected to the drain electrode DE of the thin film transistor TFT through the contact hole H. The first electrode EL1 may include a transparent conductive material, such as, for example, indium tin oxide (ITO), indium zinc oxide (IZO), and the like. Although not shown in figures, the first electrode EL1 may include a slit pattern having a plurality of openings.

The second substrate may include a second base substrate 300, a dielectric stacked layer 305, a second wire grid pattern 310, a second passivation layer 320, a black matrix BM, a color filter CF, an over-coating layer 330 and a second electrode EL2.

The second base substrate 300 may include a material which has relatively high transmittance, thermal resistance, and chemical resistance. For example, the second base substrate 300 may include glass, polyethylenenaphthalate, polyethylene terephthalate, polyacryl or a mixture thereof.

The dielectric stacked layer 305 may be disposed on the second base substrate 300. The dielectric stacked layer 305 may include dielectric layers having a relatively high refractive index and dielectric layers having a relatively low refractive index, which may be alternately stacked. The dielectric stacked layer 305 may selectively pass a specific wavelength range of light having passed the second base substrate 300 toward the second wire grid pattern 310. The dielectric stacked layer 305 may include dielectric layers having a relatively high refractive index and dielectric layers having a relatively low refractive index, which may be alternately stacked, so that the specific wavelength range of light may be selectively passed due to reflection or destructive interference on boundary interfaces of the dielectric layers.

The dielectric stacked layer 305 may have a desired thickness and a desired number of dielectric layers according to wavelength range of light passing the dielectric stacked layer 305. A more detailed explanation of the dielectric stacked layer 305 will be described in detail in FIGS. 10A and 10B.

The second wire grid pattern 310 may be disposed on the dielectric stacked layer 305. The second wire grid pattern 310 may have a line width (e.g., L of FIG. 1), a separation distance (e.g., S of FIG. 1) and a pitch (e.g., P of FIG. 1). The pitch P may be a sum of the line width L and the separation distance S. Adjacent grids of the second wire grid pattern 310 may be spaced apart by the separation distance S. For example, a thickness of the second wire grid pattern 310 may be about 150 nm, and the pitch P may be about 100 nm.

The second wire grid pattern 310 may include a first layer 312 and a second layer 314 disposed on the first layer 312. For example, the first layer 312 may include aluminum (Al), gold (Au), silver (Ag), copper (Cu), chrome (Cr), steel (Fe) or nickel (Ni) or a mixture thereof. The second layer 314 may include molybdenum (Mo) and/or titanium (Ti).

The third dielectric stacked layer pattern 315 may include dielectric layers having a relatively high refractive index and dielectric layers having a relatively low refractive index, which may be alternately stacked. The third dielectric stacked layer pattern 315 may reflect light which is not polarized. A more detailed explanation of the third dielectric stacked layer pattern 315 will be described in detail in FIGS. 10A and 10B.

The second passivation layer 320 may be disposed on the second wire grid pattern 310. The second passivation layer 320 may have a film shape. The second passivation layer 320 may protect the second wire grid pattern 310, and maintain air filled between the grids of the second wire grid pattern 310.

The black matrix BM may be disposed on the second passivation layer 320. The black matrix BM may be disposed in the peripheral area PA, and may block light. Thus, the black matrix BM may overlap the data line DL, the gate line GL, and the thin film transistor TFT.

The color filter CF may be disposed in the display area DA on the second passivation layer 320 on which the black matrix BM is formed. The color filter CF may supply colors to the light passing through the liquid crystal layer 400. The color filter CF may include a red color filter, a green color filter and blue color filter. The color filter CF may correspond to the pixel area. Color filters adjacent to each other may have different colors. The color filter CF may be overlapped with adjacent color filter CF in a boundary of the pixel area. For example, the color filter CF may be spaced apart from the adjacent color filter CF in the boundary of the pixel area.

The over-coating layer 330 may be disposed on the color filter CF and the black matrix BM. The over-coating layer 330 may flatten the color filter CF, protect the color filter CF, and insulate the color filter CF. The over-coating layer 330 may include an acrylic-epoxy material.

The second electrode EL2 may be disposed on the over-coating layer 330. The second electrode EL2 may correspond to both the display area DA and the peripheral area PA. The second electrode EL2 may correspond to the display area DA and not to the peripheral area PA. The second electrode EL2 may include a transparent conductive material, such as, for example, indium tin oxide (ITO), indium zinc oxide (IZO), and the like.

The liquid crystal layer 400 may be disposed between the first substrate and the second substrate. The liquid crystal layer 400 may include liquid crystal molecules having optical anisotropy. The liquid crystal molecules may be driven by an electric field, so that an image is displayed by passing light through or blocking light from passing through the liquid crystal layer 400.

Figure 10A:
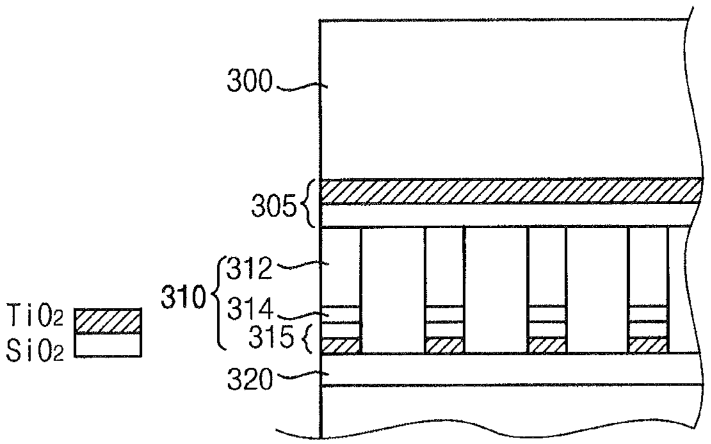
FIG. 10A is a cross-sectional view illustrating an exemplary embodiment of a dielectric stacked layer of the display panel of FIG. 9.

FIG. 10A is a cross-sectional view illustrating an exemplary embodiment of a dielectric stacked layer of the display panel of FIG. 9.

Referring to FIG. 10A, a display panel may include a second base substrate 300, a dielectric stacked layer 305, a second wire grid pattern 310 and a second passivation layer 320. The second wire grid pattern 310 may include a first layer 312, a second layer 314 and a third dielectric stacked layer pattern 315.

The dielectric stacked layer 305 may include a dielectric layer having a relatively high refractive index and a dielectric layer having a relatively low refractive index, which may be alternately stacked. The dielectric stacked layer 305 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm. For example, a pitch (e.g., P of FIG. 1) of the second wire grid pattern 310 may be less than about 120 nm, and a thickness of the second wire grid pattern 310 may be about 150 nm.

The third dielectric stacked layer pattern 315 may include a dielectric layer having a relatively high refractive index and a dielectric layer having a relatively low refractive index, which may be alternately stacked. The third dielectric stacked layer pattern 315 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm. For example, a pitch (e.g., P of FIG. 1) of the second wire grid pattern 310 may be less than about 120 nm, and a sum of a thickness of the first layer 312 and the second layer 314 of the second wire grid pattern 310 may be about 150 nm.

Figure 10B:
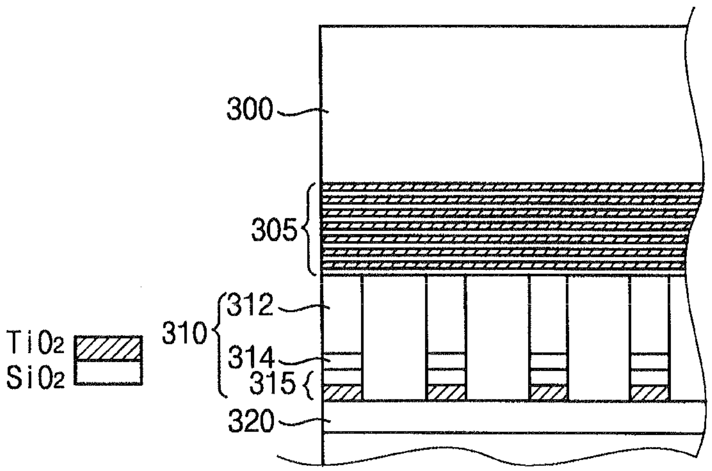
FIG. 10B is a cross-sectional view illustrating an exemplary embodiment of a dielectric stacked layer of the display panel of FIG. 9.

FIG. 10B is a cross-sectional view illustrating an exemplary embodiment of a dielectric stacked layer of the display panel of FIG. 9.

Referring to FIG. 10B, a display panel may include a second base substrate 300, a dielectric stacked layer 305, a second wire grid pattern 310 and a second passivation layer 320. The second wire grid pattern 310 may include a first layer 312, a second layer 314 and a third dielectric stacked layer pattern 315.

The dielectric stacked layer 305 may include dielectric layers having a relatively high refractive index and dielectric layers having a relatively low refractive index, which may be alternately stacked. The dielectric stacked layer 305 may includes a TiO2 layer formed of titanium dioxide (TiO2), and a SiO2 layer disposed on the TiO2 layer and formed of silicon dioxide (SiO2). Another TiO2 layer formed of titanium dioxide (TiO2) is disposed on the SiO2 layer again. Thus, a plurality of TiO2 layers and a plurality of SiO2 layers may be alternately stacked. The TiO2 layers may have a refractive index of about 1.49, and the SiO2 layers may have a refractive index of about 2.95. The TiO2 layers and the SiO2 layers may be alternately stacked seven times. Thicknesses of the TiO2 and SiO2 layers are about 20 nm, about 50 nm, about 20 nm, about 50 nm, about 20 nm, about 40 nm, about 20 nm, about 30 nm, about 20 nm, about 30 nm, about 20 nm, about 30 nm, about 20 nm and about 20 nm from the second base substrate 300 in order. For example, a pitch (e.g., P of FIG. 1) of the second wire grid pattern 310 may be about 100 nm, and a thickness of the second wire grid pattern 310 may be about 150 nm.

The third dielectric stacked layer pattern 315 may include a dielectric layer having a relatively high refractive index and a dielectric layer having a relatively low refractive index, which may be alternately stacked. The third dielectric stacked layer pattern 315 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm. For example, a pitch (e.g., P of FIG. 1) of the second wire grid pattern 310 may be less than about 120 nm, and a sum of a thickness of the first layer 312 and the second layer 314 of the second wire grid pattern 310 may be about 150 nm.

Figure 11:
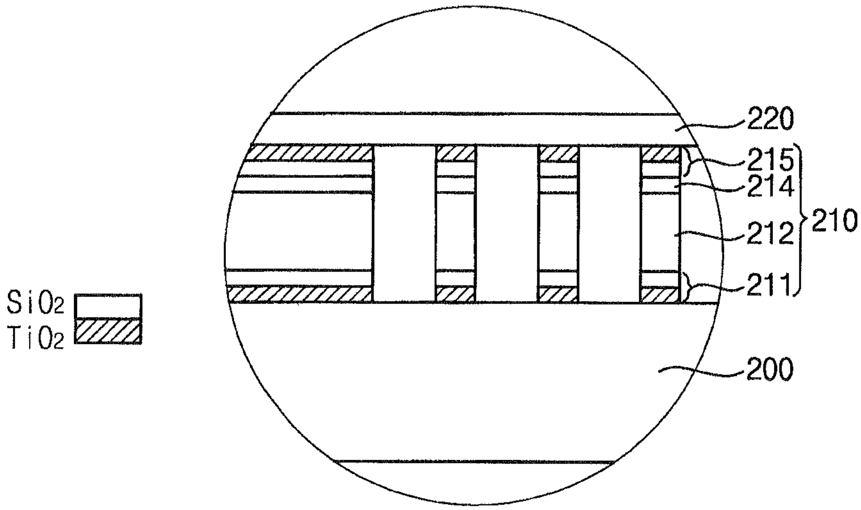
FIG. 11 is a cross-sectional view illustrating an exemplary embodiment of a first lower dielectric stacked pattern and a second lower dielectric stacked pattern of the display panel of FIG. 5.

FIG. 11 is a cross-sectional view illustrating an exemplary embodiment of a first lower dielectric stacked pattern and a second lower dielectric stacked pattern of the display panel of FIG. 5.

Referring to FIG. 11, a display panel may include a first base substrate 200, a first wire grid pattern 210, a first passivation layer 220 and a first insulation layer 230. The first wire grid pattern 210 may include a first dielectric stacked layer pattern 211, a first layer 212, a second layer 214 and a second dielectric stacked layer pattern 215.

The first dielectric stacked layer pattern 211 may include a dielectric layer having a relatively high refractive index and a dielectric layer having a relatively low refractive index, which may be alternately stacked. The first dielectric stacked layer pattern 211 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm. For example, a pitch (e.g., P of FIG. 1) of the first wire grid pattern 210 may be less than about 120 nm, and a sum of a thickness of the first layer 212 and the second layer 214 of the first wire grid pattern 210 may be about 150 nm.

The second dielectric stacked layer pattern 215 may include a dielectric layer having a relatively high refractive index and a dielectric layer having a relatively low refractive index, which may be alternately stacked. The second dielectric stacked layer pattern 215 may include a TiO2 layer formed of titanium dioxide (TiO2), and a SiO2 layer disposed on the TiO2 layer and formed of silicon dioxide (SiO2). The TiO2 layer may have a refractive index of about 1.49, and the SiO2 layer may have a refractive index of about 2.95. The TiO2 layer may have a thickness of about 50 nm, and the SiO2 layer may have a thickness of about 75 nm.

Figure 12:
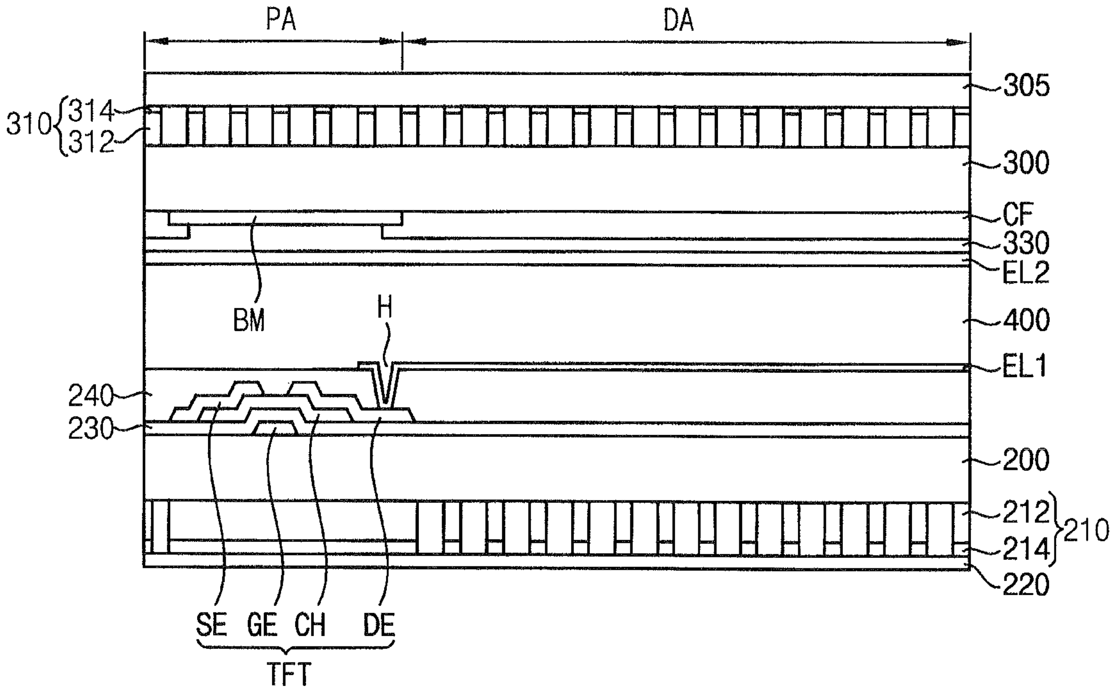
FIG. 12 is a cross-sectional view illustrating a display panel according to an exemplary embodiment of the present invention.

FIG. 12 is a cross-sectional view illustrating a display panel according to an exemplary embodiment of the present invention.

Referring to FIG. 12, a display panel may include a first substrate, a second substrate facing the first substrate, and a liquid crystal layer 400 disposed between the first substrate and the second substrate.

The first substrate may include a first passivation layer 220, a first wire grid pattern 210, a first base substrate 200, a thin film transistor TFT, a first insulating layer 230, a second insulation layer 240 and a first electrode EL1.

The first base substrate 200 may include a material which has relatively high transmittance, thermal resistance, and chemical resistance. For example, the first base substrate 200 may include glass, polyethylenenaphthalate, polyethylene terephthalate, polyacryl or a mixture thereof.

The first wire grid pattern 210 may be disposed on the first base substrate 200. The first wire grid pattern 210 may have a line width (e.g., L of FIG. 1), a separation distance (e.g., S of FIG. 1) and a pitch (e.g., P of FIG. 1). The pitch P may be a sum of the line width L and the separation distance S. Adjacent grids of the first wire grid pattern 210 may be spaced apart by the separation distance S. For example, a thickness of the first wire grid pattern 210 may be about 150 nm, and the pitch P may be about 100 nm.

The first wire grid pattern 210 may include a first layer 212 and a second layer 214 disposed on the first layer 212.

The first layer 212 may include aluminum (Al), gold (Au), silver (Ag), copper (Cu), chrome (Cr), steel (Fe) or nickel (Ni) or a mixture thereof. The second layer 214 may include molybdenum (Mo) and/or titanium (Ti).

A wire grid pattern may be formed corresponding to a display area DA configured to display an image. A pattern including a first layer, a second layer and a dielectric stacked layer may be formed corresponding to a peripheral area PA adjacent to the display area DA. The peripheral area PA might not display the image. For example, the pattern having a boundary shape corresponding to that of a black matrix BM of the second substrate, which will be described later, may be formed corresponding to the peripheral area PA, and the wire grid pattern may be formed corresponding to the display area DA.

The first passivation layer 220 may be disposed on the first wire grid pattern 210. The first passivation layer 220 may have a film shape. The first passivation layer 220 may protect the first wire grid pattern 210, and maintain air filled between the grids of the first wire grid pattern 210.

A gate line (e.g., GL of FIG. 5) and a gate electrode GE may be disposed on the first base substrate 200 opposite to the first wire grid pattern 210. The gate line and the gate electrode GE may be formed in the peripheral area PA. The gate electrode GE may be electrically connected to the gate line.

The first insulation layer 230 may be disposed on the first base substrate 200 on which the gate electrode GE and the gate line may be disposed. The first insulation layer 230 may include one or more inorganic materials such as, for example, silicon oxide (SiOx) and/or silicon nitride (SiNx).

A channel layer CH may be disposed on the first insulation layer 230 to overlap the gate electrode GE. The channel layer CH may include a semiconductor layer consisting of amorphous silicon (a-Si:H) and an ohmic contact layer consisting of n+ amorphous silicon (n+ a-Si:H). For example, the channel layer CH may include an oxide semiconductor. For example, the oxide semiconductor may include an amorphous oxide including indium (In), zinc (Zn), gallium (Ga), tin (Sn) or hafnium (Hf). For example, the oxide semiconductor may be consist of an amorphous oxide including indium (In), zinc (Zn) and/or gallium (Ga), or an amorphous oxide including indium (In), zinc (Zn) and/or hafnium (Hf). The oxide semiconductor may include an oxide such as indium zinc oxide (InZnO), indium gallium oxide (InGaO), indium tin oxide (InSnO), zinc tin oxide (ZnSnO), gallium tin oxide (GaSnO) and/or gallium zinc oxide (GaZnO).

A data line (e.g., DL of FIG. 5) crossing the gate line may be disposed on the first insulation layer 230.

A source electrode SE and a drain electrode DE may be disposed on the channel layer CH. The source electrode SE may be electrically connected to the data line DL, and spaced apart from the drain electrode DE. The drain electrode DE may be electrically connected to the first electrode EL1 through a contact hole H.

The gate electrode GE, the source electrode SE, the drain electrode DE and the channel layer CH may form the thin film transistor TFT in the peripheral area PA.

The second insulation layer 240 may be disposed on the thin film transistor TFT and the first insulation layer 230 on which the data line DL is formed. The second insulation layer 240 may include one or more inorganic materials such as, for example, silicon oxide (SiOx) and/or silicon nitride (SiNx). For example, the second insulation layer 240 may include an organic insulating material having relatively low permittivity. For example, the second insulation layer 240 may have a double layer structure of inorganic and organic insulating layers. The second insulation layer 240 may have the contact hole H exposing a portion of the drain electrode DE.

The first electrode EL1 may be disposed on the second insulation layer 240. The first electrode EL1 may be formed corresponding to the display area DA. The first electrode EL1 may be electrically connected to the drain electrode DE of the thin film transistor TFT through the contact hole H of the second insulation layer 240. The first electrode EL1 may include a transparent conductive material, such as indium tin oxide (ITO), indium zinc oxide (IZO), and the like. Although not shown in figures, the first electrode EL1 may include a slit pattern having a plurality of openings.

The second substrate may include a dielectric stacked layer 305, a second wire grid pattern 310, a second base substrate 300, a black matrix BM, a color filter CF, an over-coating layer 240 and a second electrode EL2.

The second base substrate 300 may include a material which has relatively high transmittance, thermal resistance, and chemical resistance. For example, the second base substrate 300 may include glass, polyethylenenaphthalate, polyethylene terephthalate, polyacryl or a mixture thereof.

The second wire grid pattern 310 may be disposed on the second base substrate 300. The second wire grid pattern 310 may have a line width (e.g., L of FIG. 1), a separation distance (e.g., S of FIG. 1) and a pitch (e.g., P of FIG. 1). The pitch P may be a sum of the line width L and the separation distance S. Adjacent grids of the second wire grid pattern 310 may be spaced apart by the separation distance S. For example, a thickness of the second wire grid pattern 310 may be about 150 nm, and the pitch P may be about 100 nm.

The second wire grid pattern 310 may include a first layer 312 and a second layer 314 disposed on the first layer 312. The first layer 312 may include aluminum (Al), gold (Au), silver (Ag), copper (Cu), chrome (Cr), steel (Fe) or nickel (Ni) or a mixture thereof. The second layer 314 may include molybdenum (Mo) and/or titanium (Ti).

The dielectric stacked layer 305 may be disposed on the second wire grid pattern 310. The dielectric stacked layer 305 may include dielectric layers having a relatively high refractive index and dielectric layers having a relatively low refractive index, which may be alternately stacked. For example, the dielectric stacked layer 305 may includes TiO2 layers formed of titanium dioxide (TiO2), and a SiO2 layer disposed on the TiO2 layer and formed of silicon dioxide (SiO2). A plurality of TiO2 layers and a plurality of SiO2 layers may be alternately stacked several times.

The black matrix BM may be disposed on the second base substrate 300 opposite to the second wire grid pattern 310. The black matrix BM may be disposed in the peripheral area PA, and may block light. Thus, the black matrix BM may overlap the data line, the gate line, and the thin film transistor TFT.

The color filter may be disposed in the display area DA and on the second base substrate 300 on which the black matrix BM is formed. The color filter CF may supply colors to the light passing through the liquid crystal layer 400. The color filter CF may include a red color filter, a green color filter and/or blue color filter. The color filter CF may correspond to the pixel area. Color filters adjacent to each other may have different colors. The color filter CF may be overlapped with the adjacent color filter CF in a boundary of the pixel area. For example, the color filter CF may be spaced apart from the adjacent color filter CF in the boundary of the pixel area.

The over-coating layer 330 may be disposed on the color filter CF and the black matrix BM. The over-coating layer 330 may flatten the color filter CF, protect the color filter CF, and insulate the color filter CF. The over-coating layer 330 may include acrylic-epoxy material.

The second electrode EL2 may be disposed on the over-coating layer 330. The second electrode EL2 may correspond to both the display area DA and the peripheral area PA. For example, the second electrode EL2 may correspond to the display area DA. The second electrode EL2 may include a transparent conductive material, such as indium tin oxide (ITO), indium zinc oxide (IZO), and the like.

The liquid crystal layer 400 may be disposed between the first substrate and the second substrate. The liquid crystal layer 400 may include liquid crystal molecules having optical anisotropy. The liquid crystal molecules may be driven by an electric field, so that an image is displayed by passing light through or blocking light from passing through the liquid crystal layer 400.

Figure 13:
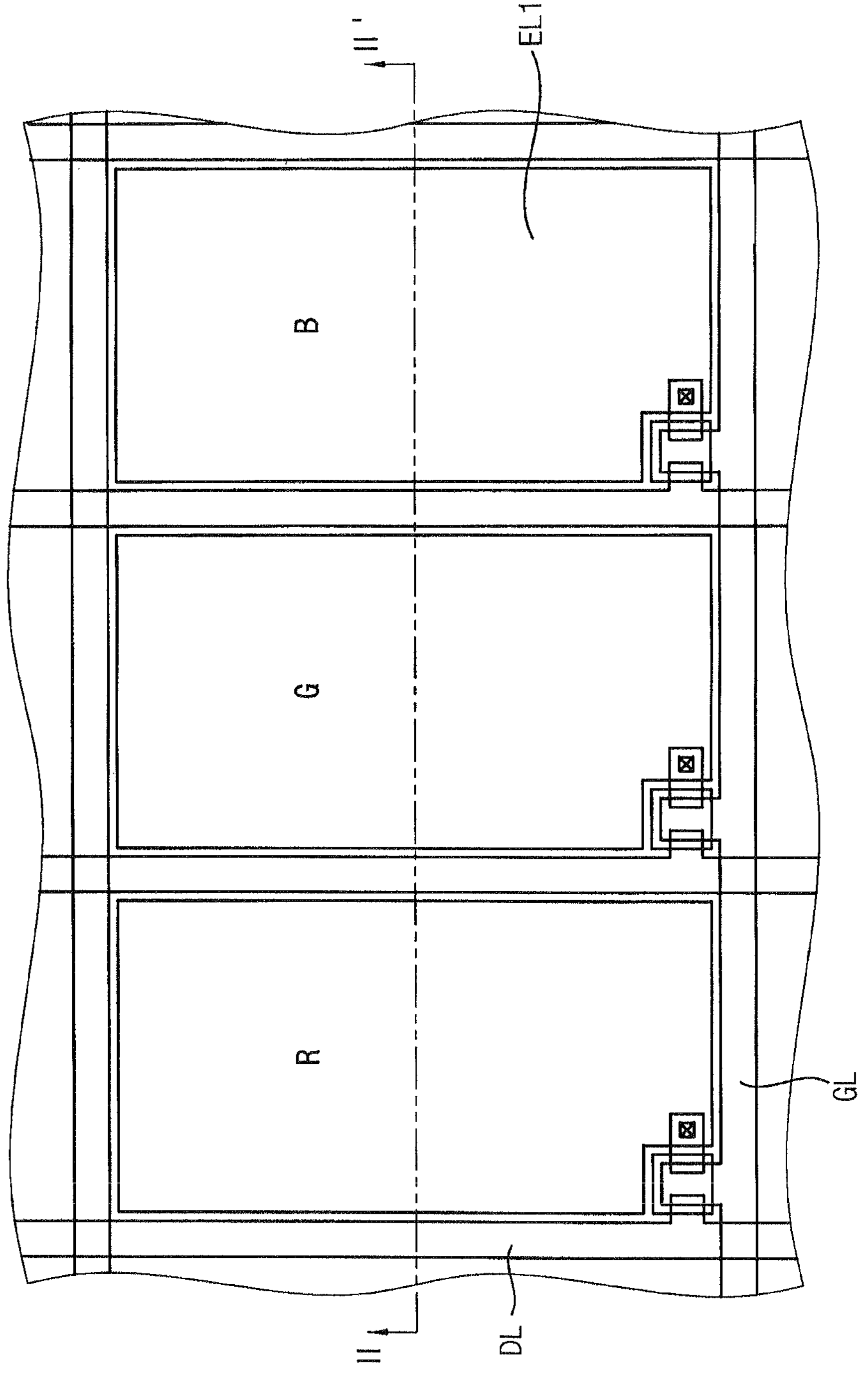
FIG. 13 is a plan view illustrating a display panel according to an exemplary embodiment of the present invention.
Figure 14:
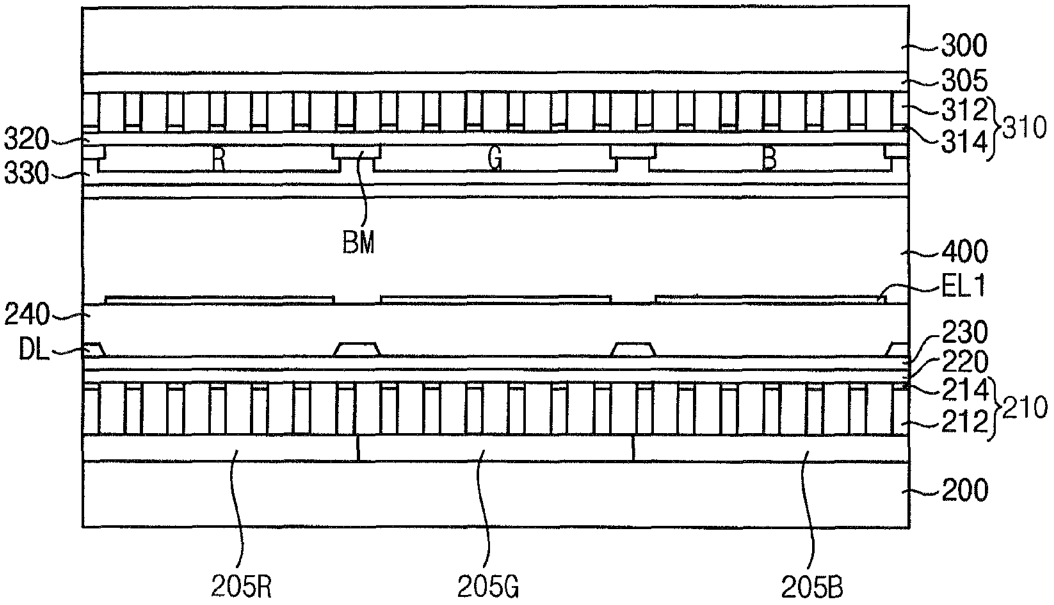
FIG. 14 is a cross-sectional view taken along a line II-II' of FIG. 13.

FIG. 13 is a plan view illustrating a display panel according to an exemplary embodiment of the present invention. FIG. 14 is a cross-sectional view taken along a line II-II' of FIG. 13.

Referring to FIGS. 13 and 14, a display panel may include a first substrate, a second substrate facing the first substrate, and a liquid crystal layer 400 disposed between the first substrate and the second substrate.

The first substrate may include a first base substrate 200, a red dielectric stacked layer 205R, a green dielectric stacked layer 205G a blue dielectric stacked layer 205B, a first wire grid pattern 210, a first passivation layer 220, a first insulation layer 230, a second insulation layer 240 and a first electrode EL1.

The first base substrate 200 may include a material which has relatively high transmittance, thermal resistance, and chemical resistance. For example, the first base substrate 200 may include glass, polyethylenenaphthalate, polyethylene terephthalate, polyacryl or a mixture thereof.

The red dielectric stacked layer 205R may be disposed on the first base substrate 200 corresponding to a red color filter R of the second substrate. The red dielectric stacked layer 205R may include dielectric layers having a relatively high refractive index and dielectric layers having a relatively low refractive index, which may be alternately stacked. The red dielectric stacked layer 205R may include dielectric layers having a relatively high refractive index and dielectric layers having a relatively low refractive index, which may be alternately stacked, so that the specific wavelength range of light may be selectively passed due to reflection or destructive interference on boundary interfaces of the dielectric layers. Thus, the red dielectric stacked layer 205R may selectively pass red light, so that the red dielectric stacked layer 205R may compensate for the red color filter R.

The red color filter R may have a desired thickness and a desired number of dielectric layers to selectively pass the red light.

For example, the red dielectric stacked layer 205R may include a TiO2 layer formed of titanium dioxide (TiO2), and a SiO2 layer disposed on the TiO2 layer and formed of silicon dioxide (SiO2). Another TiO2 layer formed of titanium dioxide (TiO2) may be disposed on the SiO2 layer. Thus, a plurality of TiO2 layers and a plurality of SiO2 layers may be alternately stacked. The TiO2 layers may have a refractive index of about 1.49, and the SiO2 layers may have a refractive index of about 2.95. The TiO2 layers and the SiO2 layers may be alternately stacked eight times. Thicknesses of the TiO2 and SiO2 layers are about 20 nm, about 40 nm, about 20 nm, about 50 nm, about 20 nm, about 60 nm, about 20 nm, about 80 nm, about 20 nm, about 60 nm, about 20 nm, about 60 nm, about 20 nm, about 60 nm, about 20 nm and about 40 nm from the second base substrate 200 in order. For example, a pitch (e.g., P of FIG. 1) of the second wire grid pattern 310 may be about 100 nm, and a thickness of the second wire grid pattern 310 may be about 150 nm.

The green dielectric stacked layer 205G may be disposed on the first base substrate 200 corresponding to a green color filter G of the second substrate. The green dielectric stacked layer 205G may include dielectric layers having a relatively high refractive index and dielectric layers having a relatively low refractive index, which may be alternately stacked. The green dielectric stacked layer 205G may include dielectric layers having a relatively high refractive index and dielectric layers having a relatively low refractive index, which may be alternately stacked, so that the specific wavelength range of light may be selectively passed due to reflection or destructive interference on boundary interfaces of the dielectric layers. Thus, the green dielectric stacked layer 205G may selectively pass green light, so that the green dielectric stacked layer 205G may compensate the green color filter G.

The blue dielectric stacked layer 205B may be disposed on the first base substrate 200 corresponding to a blue color filter B of the second substrate. The blue dielectric stacked layer 205B may include dielectric layers having a relatively high refractive index and dielectric layers having a relatively low refractive index, which may be alternately stacked. The green dielectric stacked layer 205B may include dielectric layers having a relatively high refractive index and dielectric layers having a relatively low refractive index, which may be alternately stacked, so that the specific wavelength range of light may be selectively passed due to reflection or destructive interference on boundary interfaces of the dielectric layers. Thus, the blue dielectric stacked layer 205B may selectively pass blue light, so that the blue dielectric stacked layer 205B may compensate the blue color filter B.

The first wire grid pattern 210 may be disposed on the red dielectric stacked layer 205R, the green dielectric stacked layer 205G and the blue dielectric stacked layer 205B. The first wire grid pattern 210 may have a line width (e.g., L of FIG. 1), a separation distance (e.g., S of FIG. 1) and a pitch (e.g., P of FIG. 1). The pitch P may be a sum of the line width L and the separation distance S. Adjacent grids of the first wire grid pattern 210 may be spaced apart by the separation distance S. For example, a thickness of the first wire grid pattern 210 may be about 150 nm, and the pitch P may be about 100 nm.

The first wire grid pattern 210 may include a first layer 212, a second layer 214 disposed on the first layer 212. The first layer 212 may include aluminum (Al), gold (Au), silver (Ag), copper (Cu), chrome (Cr), steel (Fe) or nickel (Ni) or a mixture thereof. The second layer 214 may include molybdenum (Mo) and/or titanium (Ti).

The first passivation layer 220 may be disposed on the first wire grid pattern 210. The first passivation layer 220 may have a film shape. The first passivation layer 220 may protect the first wire grid pattern 210, and maintain air filled between the grids of the first wire grid pattern 210.

The first passivation layer 220, the first insulation layer 230, the second insulation layer 240, the first electrode EL1, a gate line GL, and a data line DL may be substantially the same as those of the display panel of FIGS. 5 and 6. Thus, any further detailed descriptions concerning the same elements may be omitted.

The second substrate may include a second base substrate 300, a dielectric stacked layer 305, a second wire grid pattern 310, a second passivation layer 320, a black matrix BM, a red color filter R, a green color filter G, a blue color filter B, an over-coating layer 330 and a second electrode EL2.

The second base substrate 300 may include a material which has relatively high transmittance, thermal resistance, and chemical resistance. For example, the second base substrate 300 may include glass, polyethylenenaphthalate, polyethylene terephthalate, polyacryl or a mixture thereof.

The dielectric stacked layer 305 may be disposed on the second base substrate 300. The dielectric stacked layer 305 may include dielectric layers having a relatively high refractive index and dielectric layers having a relatively low refractive index, which may be alternately stacked.

The dielectric stacked layer 305 may have a desired thickness and a desired number of dielectric layers according to wavelength range of light passing the dielectric stacked layer 305. The dielectric stacked layer 305 may be substantially the same as the dielectric stacked layer 105 of FIG. 2A or 2B.

The second wire grid pattern 310 may be disposed on the dielectric stacked layer 305. The second wire grid pattern 310 may have a line width (e.g., L of FIG. 1), a separation distance (e.g., S of FIG. 1) and a pitch (e.g., P of FIG. 1). The pitch P may be a sum of the line width L and the separation distance S. Adjacent grids of the second wire grid pattern 310 may be spaced apart by the separation distance S. For example, a thickness of the second wire grid pattern 310 may be about 150 nm, and the pitch P may be about 100 nm.

The second wire grid pattern 310 may include a first layer 312 and a second layer 314 disposed on the first layer 312. For example, the first layer 312 may include aluminum (Al), gold (Au), silver (Ag), copper (Cu), chrome (Cr), steel (Fe) or nickel (Ni) or a mixture thereof. The second layer 314 may include molybdenum (Mo) and/or titanium (Ti).

The second passivation layer 320 may be disposed on the second wire grid pattern 310. The second passivation layer 320 may have a film shape. The second passivation layer 320 may protect the second wire grid pattern 310, and maintain air filled between the grids of the second wire grid pattern 310.

The black matrix BM may be disposed on the second passivation layer 320. The black matrix BM may be disposed in the peripheral area PA, and may block light. Thus, the black matrix BM may overlap the data line DL, the gate line GL, and a thin film transistor.

The red color filter R, the green color filter G and the blue color filter B may be disposed in the display area DA and on the second passivation layer 320 on which the black matrix BM is formed. The red color filter R, the green color filter G and the blue color filter B respectively supply red, green and blue colors to the light passing through the liquid crystal layer 400.

Each of the color filters may correspond to the pixel area. The color filters adjacent to each other may have different colors. The red color filter R, the green color filter G and the blue color filter B may be disposed in order.

Although the second substrate includes the red color filter R, the green color filter G and the blue color filter B in the present exemplary embodiment, the color filters may be omitted if the red dielectric stacked layer 205R, the green dielectric stacked layer 205G and/or the blue dielectric stacked layer 205B sufficiently separate colors of light.

The over-coating layer 330 may be disposed on the color filters and the black matrix BM. The over-coating layer 330 may flatten, protect and insulate the color filters. The over-coating layer 330 may include acrylic-epoxy material.

The second electrode EL2 and the liquid crystal layer 400 may be substantially the same as those of a display panel of FIGS. 5 and 6. Thus, any further detailed descriptions concerning the same elements may be omitted.

FIGS. 15A to 15I are cross-sectional views illustrating a method of manufacturing a polarizer according to an exemplary embodiment of the present invention.

Figure 15A:
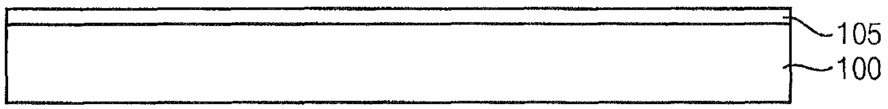
FIGS. 15A to 15I are cross-sectional views illustrating a method of manufacturing a polarizer according to an exemplary embodiment of the present invention.

Referring to FIG. 15A, a dielectric stacked layer 105 may be formed on a base substrate 100. The base substrate 100 may include a material which has relatively high transmittance, thermal resistance, and chemical resistance. For example, the base substrate 100 may include glass, polyethylenenaphthalate, polyethylene terephthalate, polyacryl or a mixture thereof.

The dielectric stacked layer 105 may include dielectric layers having a relatively high refractive index and dielectric layers having a relatively low refractive index, which may be alternately stacked. For example, a TiO2 layer formed of titanium dioxide (TiO2) may be formed on the base substrate 100. A SiO2 layer disposed on the TiO2 layer and formed of silicon dioxide (SiO2) may be formed on the TiO2 layer. The dielectric stacked layer 105 may be formed by stacking the TiO2 layer having a desired thickness and the SiO2 layer having a desired thickness a desired number of times, according to wavelength range of light passing the dielectric stacked layer 105.

Figure 15B:
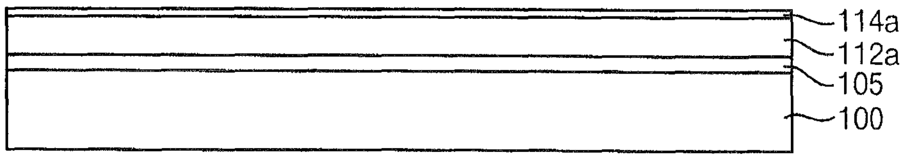

Referring to FIG. 15B, a first metal layer 112*a* is formed on the dielectric stacked layer 105. For example, the first metal layer 112*a* may include aluminum (Al), gold (Au), silver (Ag), copper (Cu), chrome (Cr), steel (Fe) or nickel (Ni) or a mixture thereof. The first metal layer 112*a* may be formed by a deposition. For example, the first metal layer 112*a* may be formed by a chemical vapor deposition. A thickness of the first metal layer 112*a* may be about 100 nm to about 200 nm.

The second metal layer 114*a* is formed on the first metal layer 112*a*. The second metal layer 114*a* may include molybdenum (Mo) and/or titanium (Ti). The second metal layer 114*a* may be formed by a chemical vapor deposition. A thickness of the second metal layer 114*a* may preferably be from about 10 nm to about 20 nm.

Figure 15C:
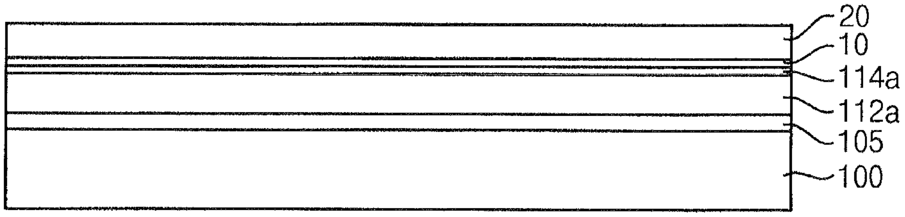

Referring to FIG. 15C, a hard mask 10 may be formed on the second metal layer 114*a*. The hard mask 10 may include a silicon oxide (SiOx). For example, the hard mask 10 may include silicon dioxide (SiO2). The hard mask 10 may formed by a deposition. For example, the hard mask 10 may formed by a chemical vapor deposition.

A polymer layer 20 may be formed on the hard mask 10. The polymer layer 20 may include a thermosetting resin and/or a photocurable resin. For example, the thermosetting resin may include urea resin, melamine resin, phenol resin, and the like. For example, the photocurable resin may include polymerizable compounds having one or more polymerizable functional groups. A photopolymerization initiator may initiate polymerization of the polymerizable compounds by, for example, irradiation, surfactants, anti-oxidant, and the like.

Figure 15D:
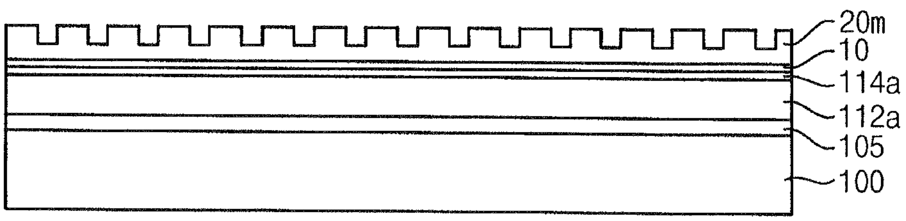

Referring to FIG. 15D, a mold (not shown) may make contact with the polymer layer 20, and then the mold may be pressed toward the polymer layer 20, so that a pattern is formed on the polymer layer 20. The mold may have a pattern opposite to a wire grid pattern of the polarizer. Thus, patterned polymer layer 20*m* may have a pattern corresponding to the wire grid pattern.

When the polymer layer 20 includes the thermosetting resin, the mold may include material which has a relatively low coefficient of thermal expansion such as, for example, a metal. When the polymer layer 20 includes the photocurable resin, the mold may include a material which has relatively high light-transmittance and strength such as, for example, a transparent macromolecule.

When the polymer layer 20 includes the thermosetting resin and the mold makes contact with the polymer layer 20, the polymer layer 20 is then heated at a temperature above a glass transition temperature of the thermosetting resin. The mold is then pressed toward the polymer layer 20, so that the pattern of the mold is imprinted on the polymer layer 20. The polymer layer 20 is then cooled at a temperature below the glass transition temperature, so that the polymer layer 20 may be hardened.

When the polymer layer 20 includes the photocurable resin and the mold makes contact with the polymer layer 20, the mold is then pressed toward the polymer layer 20, so that the pattern of the mold is imprinted on the polymer layer 20. The mold may include the material which has high light-transmittance, so that the patterned polymer layer 20*m* may be light irradiated. The patterned polymer layer 20*m* may be hardened after the patterned polymer layer 20*m* is light irradiated.

The mold may be removed from the hardened patterned polymer layer 20*m*. A pattern shape of the patterned polymer layer 20*m* may be controlled by selecting a shape of the mold.

Figure 15E:
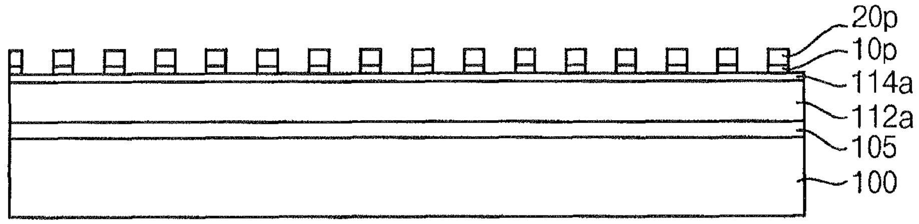

Referring to FIG. 15E, the patterned polymer layer 20*m* and the hard mask 10 may be partially removed to form a polymer pattern 20*p* and a hard mask pattern 10*p*. For example, the patterned polymer layer 20*m* and the hard mask 10 may be dry etched. Concave portions of the patterned polymer layer 20*m* and portions of the hard mask 10 which corresponds to the concave portions may be removed by etching. Thus, protrusions of the patterned polymer layer 20*m* may remain, and the second metal layer 114*a* corresponding to the concave portions may be exposed.

Figure 15F:
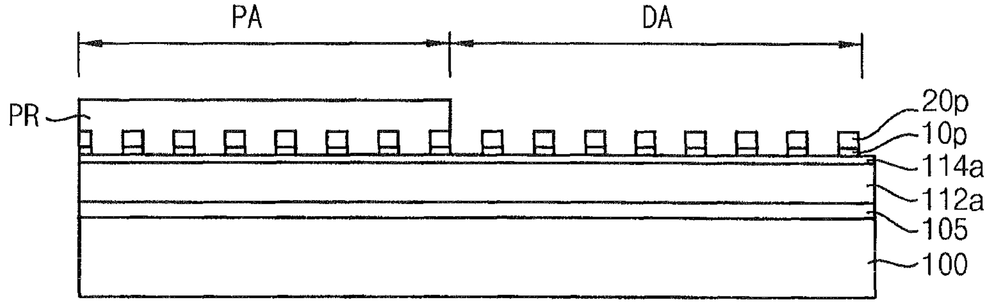

Referring to FIG. 15F, a photo-resist PR may be formed on a portion of the polymer pattern 20*p* corresponding to a peripheral area PA which may be a non-displaying area. The photo-resist PR may be for forming a pattern including second and first metal layers 114*a* and 114*b* having a boundary shape corresponding to that of a black matrix (e.g., BM of FIG. 6). The second metal layer 114*a* may be exposed by the patterned polymer layer 20*m* in a display are displaying an image.

Figure 15G:
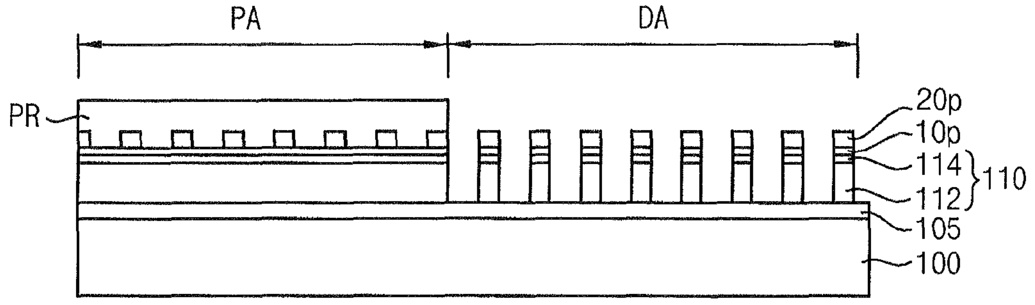

Referring to FIG. 15G, a second layer 114 and a first layer 112 may be formed by etching the second and first metal layers 114*a* and 112*a*, respectively, in the display area DA. The first and second layers 112 and 114 may form a wire grid pattern 110. Specifications of the wire grid pattern 110 may be controlled by adjusting a thickness of the first and second metal layer 112_a_ and 114_a_ and selecting a desired shape of the mold.

Portions of the first and second metal layer 112_a_ and 114_a_ which correspond to the peripheral area PA may not be etched due to the photo-resist PR, so that a pattern having the same shape as the photo-resist PR is formed.

Figure 15H:
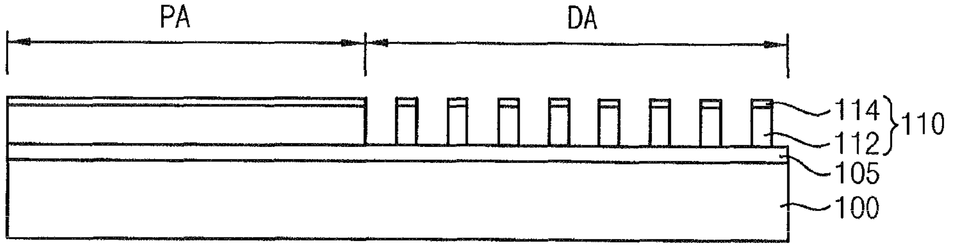

Referring to FIG. 15H, the remaining photo-resist PR, the polymer pattern 20_p_ and the hard mask pattern 10_p_ may be removed.

Figure 15I:
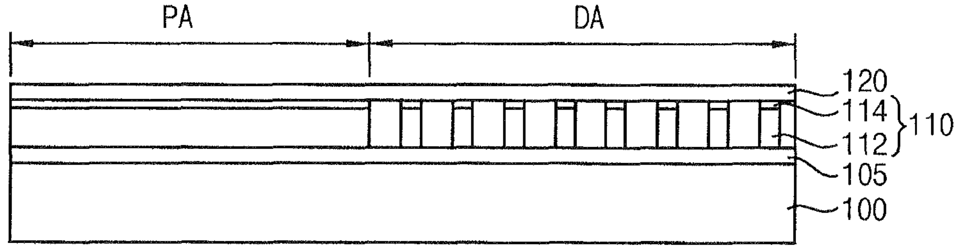

Referring to FIG. 15I, a passivation layer 120 may be formed on the wire grid pattern 110. The passivation layer 120 may have a film shape. The passivation layer 120 may protect the wire grid pattern 110, and maintain air filled between the grids of the wire grid pattern 110.

Although a method according to an exemplary embodiment of the present invention is described in FIGS. 15A to 15I, various methods such as, for example, a nano-imprint method, and/or an etching method using a resist-pattern as a mask to form a metal pattern may be used to form the polarizer.

Figure 16A:
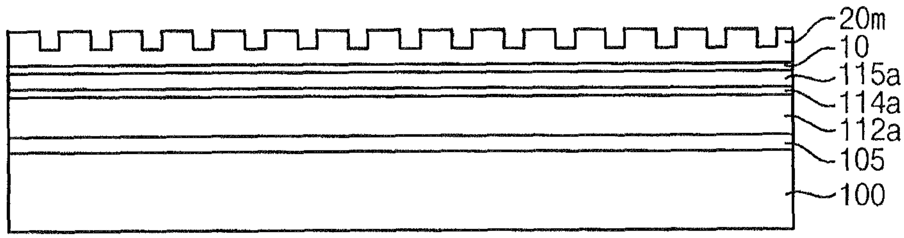
FIGS. 16A to 16B are cross-sectional views illustrating a method of manufacturing a polarizer according to an exemplary embodiment of the present invention.
Figure 16B:
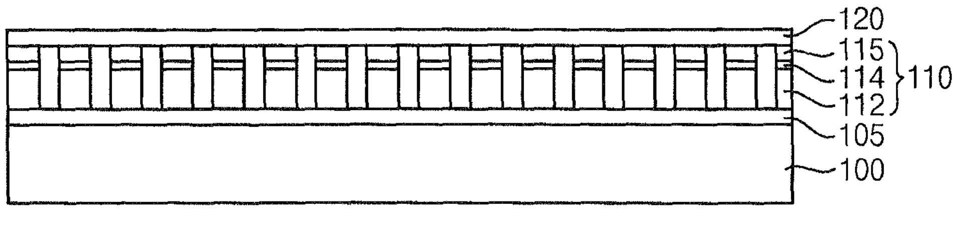

FIGS. 16A to 16B are cross-sectional views illustrating a method of manufacturing a polarizer according to an exemplary embodiment of the present invention. The method is substantially the same as the method of FIGS. 15A to 15I, except for a second dielectric stacked layer pattern 115. Thus, any further detailed descriptions concerning the same elements may be omitted.

Referring to FIG. 16A, a dielectric stacked layer 105 may be formed on a base substrate 100. A first metal layer 112_a_ may be formed on the dielectric stacked layer 105. A second metal layer 114_a_ may be formed on the first metal layer 112_a_.

A second dielectric stacked pattern base layer 115_a_ may be formed on the second metal layer 114_a_. The second dielectric stacked pattern base layer 115_a_ may include dielectric layers having a relatively high refractive index and dielectric layers having a relatively low refractive index, which may be alternately stacked. For example, a SiO2 layer formed of silicon dioxide (SiO2) may be formed on the second metal layer 114_a_. A TiO2 layer formed of titanium dioxide (TiO2) may be formed on the SiO2 layer. The second dielectric stacked pattern base layer 115_a_ may be formed by stacking the TiO2 layer having a desired thickness and the SiO2 layer having a desired thickness a desired number of times.

A hard mask 10 may be formed on the second dielectric stacked pattern base layer 115_a_. A polymer layer 20 may be formed on the hard mask 10. A patterned polymer layer 20_m_ may be formed using a mold. The polymer layer 20 may be hardened, and then the mold may be removed to form the patterned polymer layer 20_m_.

Referring to FIG. 16B, a wire grid pattern 110 including a first layer 112, a second layer 114 and the second dielectric stacked layer pattern 115 may be formed by etching the second dielectric stacked pattern base layer 115_a_, the second metal layer 114_a_ and the first metal layer 112_a_ using the patterned polymer layer 20_m_ and the hard mask 10.

A passivation layer 120 may be formed on the wire grid pattern 110.

Figure 17A:
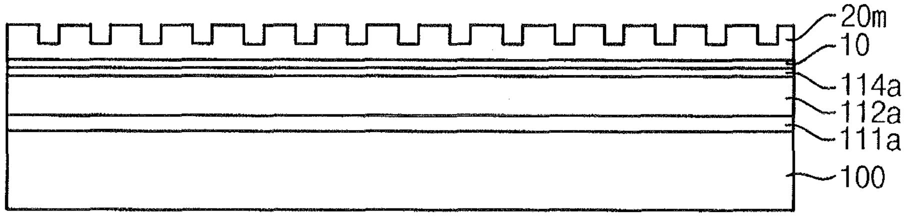
FIGS. 17A to 17B are cross-sectional views illustrating a method of manufacturing a polarizer according to an exemplary embodiment of the present invention.
Figure 17B:
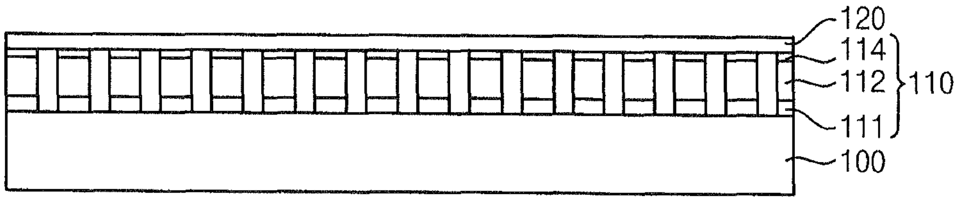

FIGS. 17A to 17B are cross-sectional views illustrating a method of manufacturing a polarizer according to an exemplary embodiment of the present invention.

Referring to FIG. 17A, a first dielectric stacked pattern base layer 111_a_ may be formed on a base substrate 100.

The first dielectric stacked pattern base layer 111_a_ may include dielectric layers having a relatively high refractive index and dielectric layers having a relatively low refractive index, which may be alternately stacked. For example, a TiO2 layer formed of titanium dioxide (TiO2) may be formed on the base substrate 100. A SiO2 layer disposed on the TiO2 layer and formed of silicon dioxide (SiO2) may be formed on the TiO2 layer. The first dielectric stacked pattern base layer 111_a_ may be formed by stacking the TiO2 layer having a desired thickness and the SiO2 layer having a desired thickness a desired number of times.

A first metal layer 112_a_ may be formed on the first dielectric stacked pattern base layer 111_a_. A second metal layer 114_a_ may be formed on the first metal layer 112_a_. A hard mask 10 may be formed on the second metal layer 114_a_. A polymer layer 20 may be formed on the hard mask 10. A patterned polymer layer 20_m_ may be formed using a mold. The polymer layer 20 may be hardened, and then the mold may be removed.

Referring to FIG. 17B, a wire grid pattern 110 including a first dielectric stacked layer pattern 111, a first layer 112, and a second layer 114 may be formed by etching the second metal layer 114_a_, the first metal layer 112_a_ and the first dielectric stacked pattern base layer 111_a_ using the patterned polymer layer 20_m_ and the hard mask 10.

A passivation layer 120 may be formed on the wire grid pattern 110.

According to exemplary embodiments of the present invention, the polarizer may include a dielectric stacked layer. The dielectric stacked layer may include dielectric layers having a relatively high refractive index and dielectric layers having a relatively low refractive index, which may be alternately stacked, so that the polarizer may reflect light having a specific wavelength range. Thus, the display apparatus may be protected from external ultraviolet rays.

For example, the polarizer may include the first and/or second dielectric stacked layer patterns. Thus, light efficiency of the display apparatus may be increased.

For example, the polarizer may include the pattern having a boundary shape same as that of a black matrix in the peripheral area. Thus, light efficiency of the backlight unit may be increased.

For example, the display panel may include the red dielectric stacked layer, the green dielectric stacked layer and the blue dielectric stacked layer, so that the dielectric stacked layers may compensate or substitute for the color filter.

While the invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A polarizer, comprising:

a base substrate;

a wire grid pattern disposed on the base substrate and having a line width, a separation distance and a pitch, wherein the pitch is a sum of the line width and the separation distance, and adjacent grids of the wire grid pattern are spaced apart by the separation distance, wherein the wire grid pattern comprises a first layer and a second layer; and a passivation layer disposed on the wire grid pattern, wherein the wire grid pattern comprises a first dielectric stacked layer pattern disposed between the base substrate and the first layer, and wherein the wire grid pattern comprises a second dielectric stacked layer pattern disposed between the second layer and the passivation layer.

2. The polarizer of claim 1, wherein the first dielectric stacked layer pattern comprises titanium dioxide (TiO2), and the second dielectric stacked layer pattern comprises silicon dioxide (SiO2).

3. The polarizer of claim 1, wherein the wire grid pattern comprises a first layer comprising aluminum (Al), gold (Au), silver (Ag), copper (Cu), chrome (Cr), steel (Fe), or nickel (Ni), and a second layer comprising molybdenum (Mo), or titanium (Ti).

4. A polarizer, comprising:

a base substrate;

a wire grid pattern disposed on the base substrate and having a line width, a separation distance and a pitch, wherein the pitch is a sum of the line width and the separation distance, and adjacent grids of the wire grid pattern are spaced apart by the separation distance; and a passivation layer disposed on the wire grid pattern, wherein the wire grid pattern comprises a first layer and a second layer, and a first dielectric stacked layer pattern disposed between the first layer and the base substrate, and wherein the first dielectric stacked layer pattern comprises a first dielectric layer having a high refractive index and a second dielectric layer having a low refractive index, and wherein the wire grid pattern comprises a second dielectric stacked layer pattern disposed between the second layer and the passivation layer, and wherein the second dielectric stacked layer pattern comprises a third dielectric layer having a high refractive index and a fourth dielectric layer having a low refractive index.

5. The polarizer of claim 4, wherein the first layer of the wire grid pattern is thicker than the second layer of the wire grid pattern.

6. A display panel, comprising:

a first substrate comprising:

a first base substrate;

a first wire grid pattern disposed on the first base substrate; and a first passivation layer disposed on the first wire grid pattern, wherein the first wire grid pattern comprises a first layer and a second layer, and a first dielectric stacked layer pattern disposed between the first layer of the first wire grid pattern and the first base substrate, and wherein the first dielectric stacked layer pattern comprises a first dielectric layer having a high refractive index and a second dielectric layer having a low refractive index, and wherein the first wire grid pattern comprises a second dielectric stacked layer pattern disposed between the second layer of the first wire grid pattern and the first passivation layer, and wherein the second dielectric stacked layer pattern comprises a third dielectric layer having a high refractive index and a fourth dielectric layer having a low refractive index;

a second substrate facing the first substrate and comprising:

a second base substrate;

a dielectric stacked layer disposed on the second base substrate, wherein the dielectric stacked layer comprises a fifth dielectric layer having a high refractive index and a sixth dielectric layer having a low refractive index; and a second wire grid pattern disposed on the dielectric stacked layer; and a liquid crystal layer disposed between the first substrate and the second substrate.

7. The display panel of claim 6, further comprising a second passivation layer disposed on the second wire grid pattern, wherein the second wire grid pattern of the second substrate comprises:

a first layer; and a third dielectric stacked layer pattern disposed between the first layer and the second passivation layer, the third dielectric stacked layer comprising a seventh dielectric layer having a high refractive index and an eighth dielectric layer having a low refractive index.

8. The display panel of claim 7, wherein the first layer of the first wire grid pattern of the first substrate comprises aluminum (Al), gold (Au), silver (Ag), copper (Cu), chrome (Cr), steel (Fe), or nickel (Ni), and the second layer of the first wire grid pattern of the first substrate comprises molybdenum (Mo), or titanium (Ti), the first layer of the second wire grid pattern of the second substrate comprises aluminum (Al), gold (Au), silver (Ag), copper (Cu), chrome (Cr), steel (Fe), or nickel (Ni), and the second wire grid pattern further comprises a second layer comprising molybdenum (Mo), or titanium (Ti).

9. The display panel of claim 6, wherein the second substrate further comprises a black matrix disposed on the second wire grid pattern, the black matrix formed in a peripheral area adjacent to a display area configured to display an image.

10. The display panel of claim 6, wherein the first wire grid pattern of the first substrate comprises a pattern having a boundary shape, the boundary shape being substantially the same as a shape of the black matrix in the peripheral area.

11. A display panel, comprising:

a first substrate comprising:

a first base substrate;

a first wire grid pattern disposed on the first base substrate and having a first line width, a first separation distance and a first pitch, wherein the first pitch is a sum of the first line width and the first separation distance, and adjacent grids of the first wire grid pattern are spaced apart by the first separation distance; and a first passivation layer disposed on the first wire grid pattern, wherein the first wire grid pattern of the first substrate comprises:

a first layer comprising metal;

a first dielectric stacked layer pattern disposed between the first layer and the base substrate, the first dielectric stacked layer pattern comprising a first dielectric layer having a high refractive index and a second dielectric layer having a low refractive index; and a second dielectric stacked layer pattern disposed between the first layer and the first passivation layer, the second dielectric stacked layer pattern comprising a third dielectric layer having a high refractive index and a fourth dielectric layer having a low refractive index;

a second substrate facing the first substrate and comprising:

a second base substrate;

a dielectric stacked layer disposed on the second base substrate, wherein the dielectric stacked layer comprises a fifth dielectric layer having a high refractive index and a sixth dielectric layer having a low refractive index; and a second wire grid pattern disposed on the dielectric stacked layer and having a second line width, a second separation distance and a second pitch, wherein the second pitch is a sum of the second line width and the second separation distance, and adjacent grids of the second wire grid pattern are spaced apart by the second separation distance; and a liquid crystal layer disposed between the first substrate and the second substrate.

12. The display panel of claim 11, wherein the first layer of the first wire grid pattern of the first substrate comprises aluminum (Al), gold (Au), silver (Ag), copper (Cu), chrome (Cr), steel (Fe), or nickel (Ni), the first wire grid pattern further comprises a second layer comprising molybdenum (Mo), or titanium (Ti), a first layer of the second wire grid pattern of the second substrate comprises aluminum (Al), gold (Au), silver (Ag), copper (Cu), chrome (Cr), steel (Fe), or nickel (Ni), and the second wire grid pattern further comprises a second layer comprising molybdenum (Mo), or titanium (Ti).

13. The display panel of claim 11, wherein the first substrate further comprises a black matrix disposed on the second wire grid pattern, the black matrix formed in a peripheral area adjacent to a display area configured to display an image.

14. The display panel of claim 11, wherein the first wire grid pattern of the first substrate comprises a pattern having a boundary shape, the boundary shape being substantially the same as a shape of the black matrix in the peripheral area.

15. The polarizer of claim 12, wherein the first layer of the first wire grid pattern of the first substrate is thicker than the second layer of the first wire grid pattern of the first substrate.

* * * * *